United States Patent
Chen et al.

(10) Patent No.: US 12,425,602 B2
(45) Date of Patent: Sep. 23, 2025

(54) SUBBLOCK LEVEL TEMPORAL MOTION VECTOR PREDICTION WITH MULTIPLE DISPLACEMENT VECTOR PREDICTORS AND AN OFFSET

(71) Applicant: Tencent America LLC, Palo Alto, CA (US)

(72) Inventors: Lien-Fei Chen, Hsinchu (TW); Guichun Li, San Jose, CA (US); Xin Zhao, Santa Clara, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 227 days.

(21) Appl. No.: 17/984,107

(22) Filed: Nov. 9, 2022

(65) Prior Publication Data
US 2023/0388513 A1 Nov. 30, 2023

Related U.S. Application Data

(60) Provisional application No. 63/345,802, filed on May 25, 2022.

(51) Int. Cl.
*H01L 29/94* (2006.01)
*H04N 19/105* (2014.01)
(Continued)

(52) U.S. Cl.
CPC ......... *H04N 19/137* (2014.11); *H04N 19/105* (2014.11); *H04N 19/176* (2014.11); *H04N 19/70* (2014.11)

(58) Field of Classification Search
CPC .. H04N 19/137; H04N 19/105; H04N 19/176; H04N 19/70; H04N 19/52; H04N 19/88
See application file for complete search history.

(56) References Cited

U.S. PATENT DOCUMENTS

| | | | |
|---|---|---|---|
| 2003/0108099 A1* | 6/2003 | Nagumo | G06T 9/20 375/E7.199 |
| 2020/0154101 A1* | 5/2020 | Li | H04N 19/46 |

(Continued)

OTHER PUBLICATIONS

High Efficiency Video Coding, Rec. ITU-T H.265 v4 Dec. 2016, pp. 1-664.

(Continued)

*Primary Examiner* — Joseph Suh
(74) *Attorney, Agent, or Firm* — ArentFox Schiff LLP

(57) ABSTRACT

A method and an apparatus are provided. The apparatus includes processing circuitry that receives a coded video bitstream comprising a current picture that includes a current block. The processing circuitry determines, based on a syntax element in the coded video bitstream, that the current block including a plurality of subblocks is coded in a subblock-based temporal motion vector prediction (SbTMVP) mode. The processing circuitry determines a plurality of displacement vector (DV) predictor (DVP) candidates and receives a base index indicating a DVP in the plurality of DVP candidates and a DV offset of the current block. The processing circuitry determines a DV based on the DVP and the DV offset. The DV indicates a block collocated with the current block in a collocated reference picture. The processing circuitry reconstructs a subblock in the plurality of subblocks based on motion information of a corresponding subblock in the collocated block.

11 Claims, 24 Drawing Sheets

(51) Int. Cl.
  *H04N 19/137* (2014.01)
  *H04N 19/176* (2014.01)
  *H04N 19/70* (2014.01)

(56) References Cited

U.S. PATENT DOCUMENTS

2020/0195948 A1* 6/2020 Li .................. H04N 19/176
2022/0094968 A1  3/2022 Goswami et al.
2022/0150471 A1* 5/2022 Bae ................. H04N 19/52

OTHER PUBLICATIONS

ITU-T and ISO/IEC, "Versatile Video Coding", ITU-T Rec. H.266 and ISO/IEC 23090-3, 2020, pp. 1-516.
H. Yang, H. Chen, J. Chen, S. Esenlik, S. Sethuraman, X. Xiu, E. Alshina, and J. Luo, "Subblock-Based Motion Derivation and Inter Prediction Refinement in Versatile Video Coding Standard", IEEE Trans. Circuits Syst. Video Technol., vol. 31, No. 10, pp. 3862-3877, Oct. 2021.
M. Coban, et al., "Algorithm description of Enhanced Compression Model 4 (ECM 4)", JVET-Y2025-v2, Joint Video Experts Team (JVET) of ITU-T SG 16 WP 3 and ISO/IEC JTC 1/SC 29, 23rd Meeting, by teleconference, Jul. 7-16, 2021, pp. 1-32.
International Search Report and Written Opinion in PCT/US2022/079732, mailed Apr. 7, 2023, 13 pages.

* cited by examiner

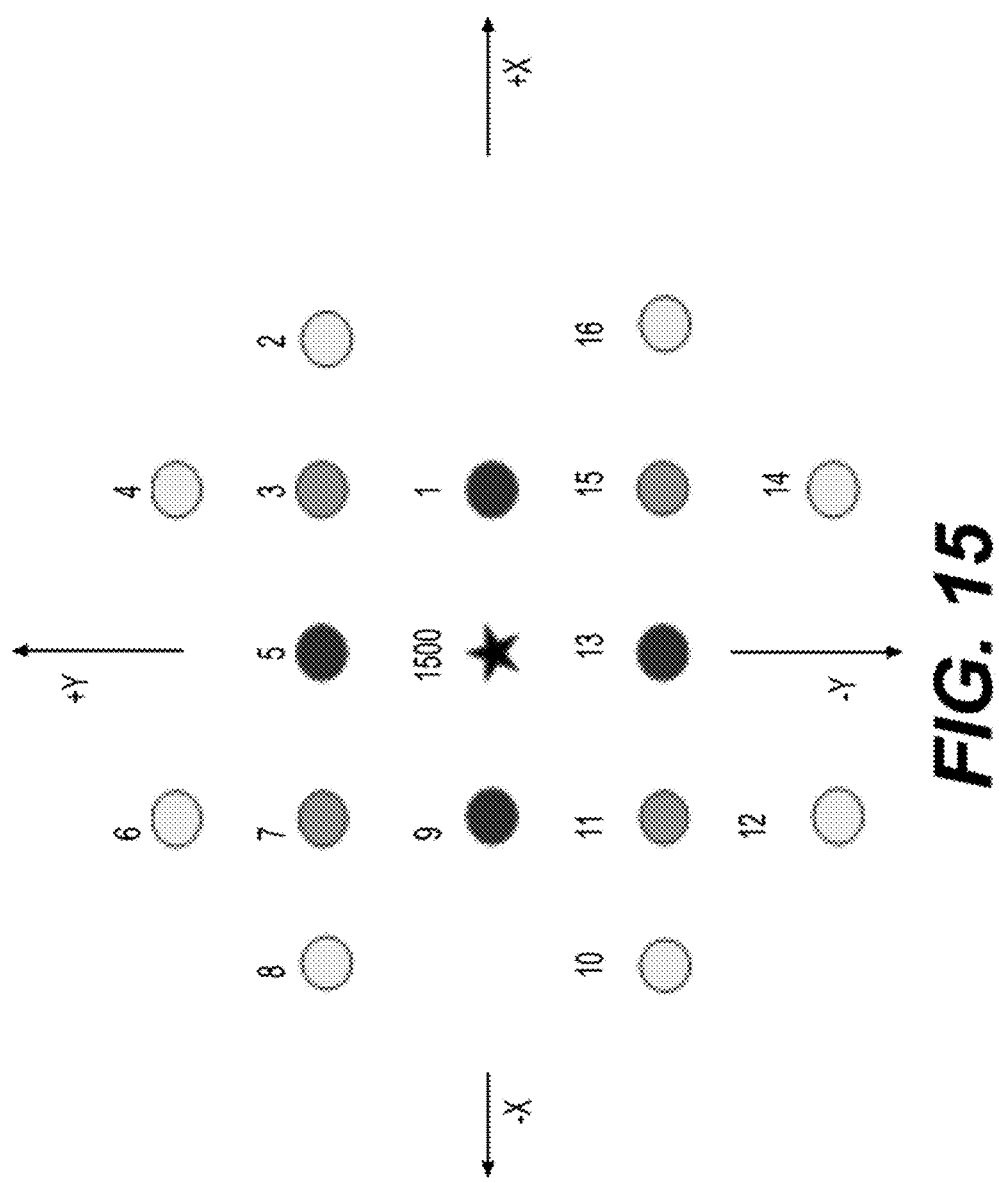

SUBBLOCK LEVEL TEMPORAL MOTION VECTOR PREDICTION WITH MULTIPLE DISPLACEMENT VECTOR PREDICTORS AND AN OFFSET

INCORPORATION BY REFERENCE

The present application claims the benefit of priority to U.S. Provisional Application No. 63/345,802, "SUBBLOCK BASED MOTION VECTOR PREDICTOR WITH MULTIPLE BASE INDEX AND MV OFFSET" filed on May 25, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Uncompressed digital images and/or video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed image and/or video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of image and/or video coding and decoding can be the reduction of redundancy in the input image and/or video signal, through compression. Compression can help reduce the aforementioned bandwidth and/or storage space requirements, in some cases by two orders of magnitude or more. Although the descriptions herein use video encoding/decoding as illustrative examples, the same techniques can be applied to image encoding/decoding in similar fashion without departing from the spirit of the present disclosure. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform processing, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding used in, for example, MPEG-2 generation coding technologies, does not use intra prediction. However, some newer video compression technologies include techniques that attempt to perform prediction based on, for example, surrounding sample data and/or metadata obtained during the encoding and/or decoding of blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, a specific technique in use can be coded as a specific intra prediction mode that uses the specific technique. In certain cases, intra prediction modes can have submodes and/or parameters, where the submodes and/or parameters can be coded individually or included in a mode codeword, which defines the prediction mode being used. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values of already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from the 33 possible predictor directions (corresponding to the 33 angular modes of the 35 intra modes) defined in H.265. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore, no negative values need to be used.

Intra picture prediction can work by copying reference sample values from the neighboring samples indicated by the signaled prediction direction. For example, assume the coded video bitstream includes signaling that, for this block, indicates a prediction direction consistent with arrow (102)—that is, samples are predicted from samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013). Currently, JEM/VVC/BMS can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction direction bits that represent the direction in the coded video bitstream can be different from video coding technology to video coding technology. Such mapping can range, for example, from simple direct mappings, to codewords, to complex adaptive schemes involving most probable modes, and similar techniques. In most cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Image and/or video coding and decoding can be performed using inter-picture prediction with motion compensation. Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described with reference to FIG. 2 is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry that receives a base index and displacement vector (DV) offset information of a current block in a current picture from a coded video bitstream. The current block includes a plurality of subblocks that are reconstructed using a subblock-based temporal motion vector prediction (SbTMVP) mode. The base index indicates a DV predictor (DVP) in a plurality of DVP candidates of the current block. The processing circuitry determines a DV of the current block based on the DVP of the current block and a DV offset of the current block that is indicated by the DV offset information. The DV indicates a collocated block in a collocated reference picture. The collocated block is collocated with the current block. The processing circuitry determines motion information of a subblock in the plurality of subblocks based on motion information of a corresponding subblock in the collocated block and reconstructs the subblock in the plurality of subblocks based on the motion information of the subblock in the plurality of subblocks.

In an example, the processing circuitry determines the DV to be a vector sum of the DVP and the DV offset.

In an example, the processing circuitry determines the plurality of DVP candidates based on motion vectors (MVs) of spatial neighbors of the current block. A reference picture of each of the spatial neighbors that is used to determine one of the plurality of DVP candidates is the collocated reference picture.

In an example, if a number of the MVs of the spatial neighbors is less than a threshold, the processing circuitry inserts a zero MV into the plurality of DVP candidates.

In an embodiment, the processing circuitry determines the plurality of DVP candidates based on candidates in a merge candidate list. The candidates includes at least one of (a) a spatial motion vector predictor (MVP) candidate, (b) a history-based MVP (HMVP) candidate, (c) a pairwise average candidate, or (d) a zero motion vector (MV). The candidates do not include a temporal MVP (TMVP) candidate. A reference picture of each of the candidates that is used to determine one of the plurality of DVP candidates is the collocated reference picture.

In an embodiment, the processing circuitry constructs a subblock-based merge list of the current block. Subblock-based merge candidates in the subblock-based merge list includes a plurality of SbTMVP merge candidates and at least one affine merge candidate. Each of the plurality of SbTMVP merge candidates corresponds to a respective one of the plurality of DVP candidates.

In an example, the base index indicates which SbTMVP merge candidate in a subset of the subblock-based merge candidates that is the plurality of SbTMVP merge candidates is to be selected. The selected SbTMVP merge candidate corresponds to the DVP.

In an example, a first number $K_0$ of the plurality of SbTMVP merge candidates and a second number $K_1$ of the at least one affine merge candidate are signaled in a high-level syntax. $K_0$ and $K_1$ are positive integers. The base index indicates which subblock-based merge candidate in a subset of the subblock-based merge candidates that includes (i) the plurality of SbTMVP merge candidates and (ii) the at least one affine merge candidate is to be selected. The selected subblock-based merge candidate corresponds to the DVP and one of the plurality of SbTMVP merge candidates.

In an example, the processing circuitry constructs an SbTMVP merge candidate list of the current block including a plurality of SbTMVP merge candidates. Each of the plurality of SbTMVP merge candidates corresponds to a respective one of the plurality of DVP candidates. The SbTMVP merge candidate list does not include an affine merge candidate.

In an example, a merge mode or a merge motion vector difference (MMVD) mode is applied to the current block. The processing circuitry receives a flag from the coded video bitstream. The flag indicates that the SbTMVP mode is applied to the current block.

In an example, a merge mode or a merge motion vector difference (MMVD) mode is applied to the current block. The processing circuitry receives a first flag from the coded video bitstream. The first flag indicates that a subblock-based merge mode is applied to the current block. The processing circuitry receives a second flag from the coded video bitstream and the second flag indicates that the subblock-based merge mode is the SbTMVP mode.

In an example, the processing circuitry constructs a subblock-based merge list of the current block. The subblock-based merge list includes one SbTMVP merge candidate and at least one affine merge candidate. The one SbTMVP merge candidate corresponds to the DVP. The processing circuitry receives an index that points to the one SbTMVP merge candidate in the subblock-based merge list. The index indicates that the SbTMVP mode is applied to the current block.

In an embodiment, the processing circuitry receives the coded video bitstream comprising the current picture. The current picture includes the current block. The current block includes the plurality of subblocks. The processing circuitry determines, based on a syntax element in the coded video bitstream, that the current block including the plurality of subblocks is coded in the SbTMVP mode. The processing circuitry determines the plurality of DVP candidates for the current block. Each DVP candidate is derived from one or more motion vectors (MVs). The processing circuitry receives the base index and the DV offset of the current block. The base index indicates the DVP in the plurality of DVP candidates of the current block. The processing circuitry determines the DV for the current block based on the DVP indicated in the plurality of DVP candidates for the current block and the DV offset of the current block. The DV indicates the block collocated with the current block in the collocated reference picture. The processing circuitry reconstructs the subblock in the plurality of subblocks based on the motion information of the corresponding subblock in the collocated block (the block collocated with the current block in the collocated reference picture).

Aspects of the disclosure also provide a non-transitory computer-readable medium storing instructions which when executed by a computer for video decoding cause the computer to perform the methods for video decoding.

BRIEF DESCRIPTION OF THE DRAWINGS

Further features, the nature, and various advantages of the disclosed subject matter will be more apparent from the following detailed description and the accompanying drawings in which:

FIG. 15 shows additional refinement positions along multiple diagonal angles in the MMVD mode.

DETAILED DESCRIPTION OF EMBODIMENTS

Figure 1A:
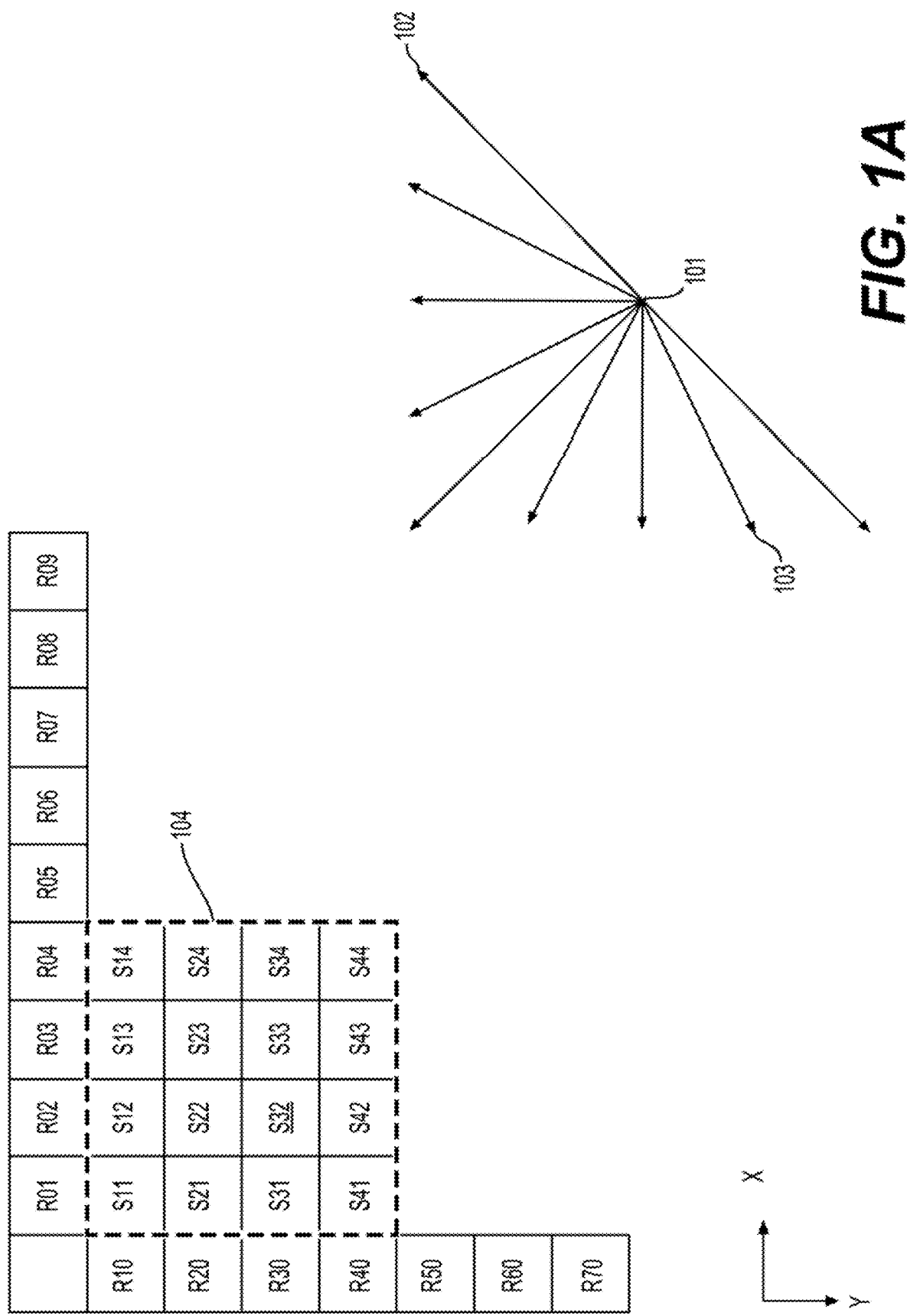
FIG. 1A is a schematic illustration of an exemplary subset of intra prediction modes.
Figure 1B:
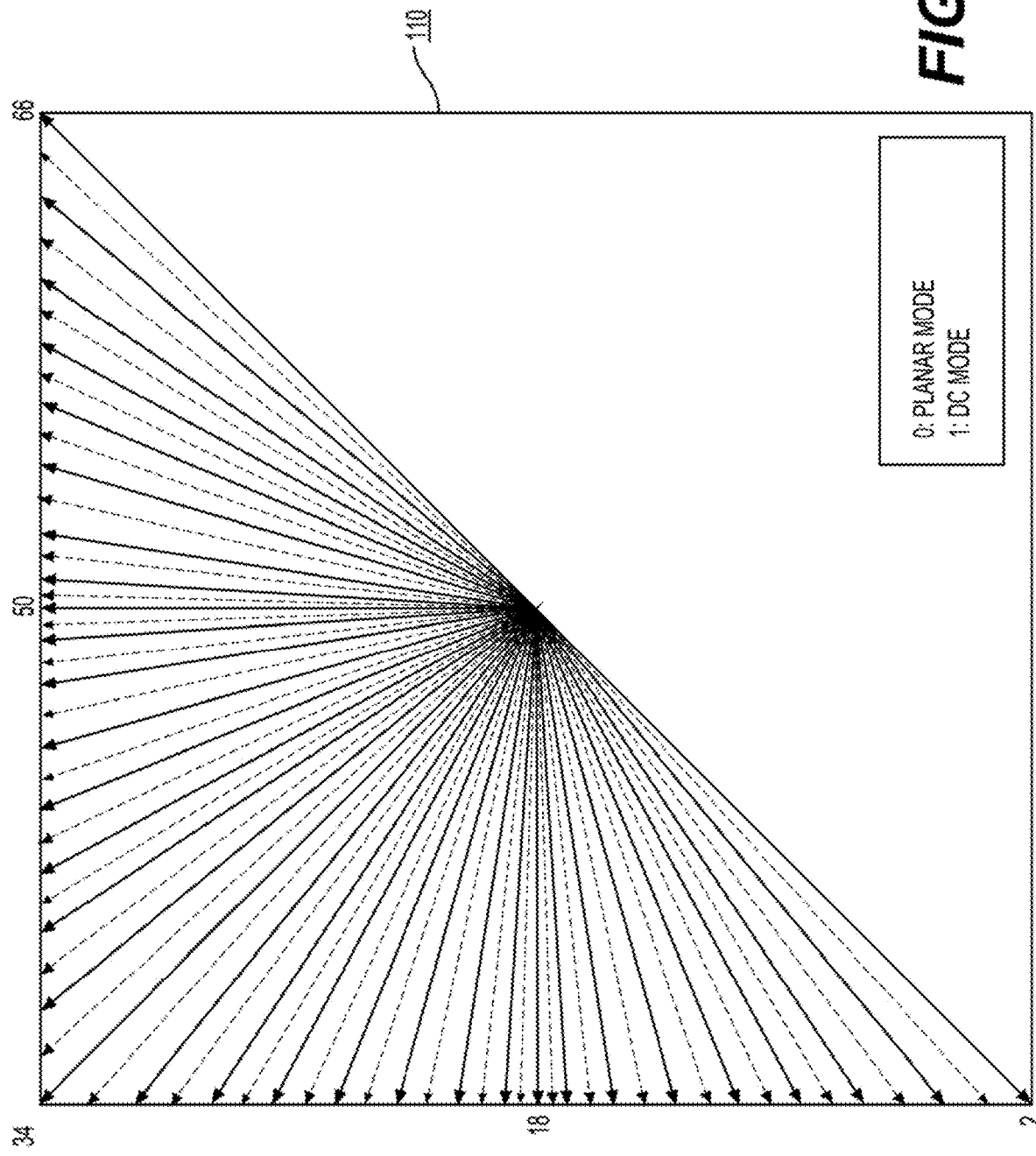
FIG. 1B is an illustration of exemplary intra prediction directions.
Figure 2:
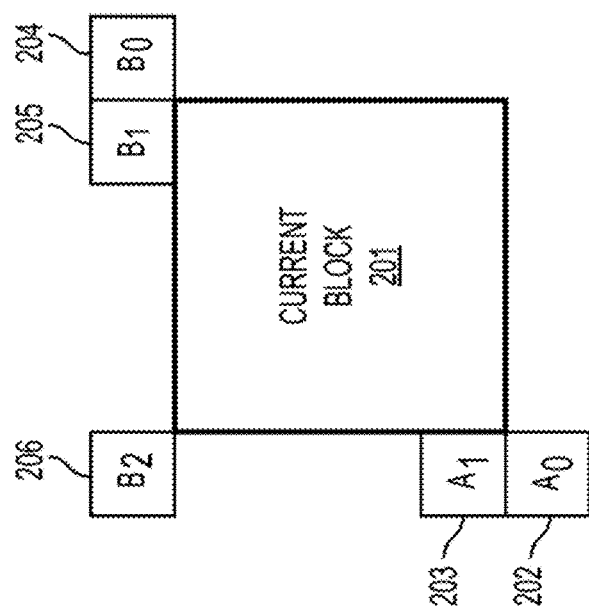
FIG. 2 shows an example of a current block (201) and surrounding samples.
Figure 3:
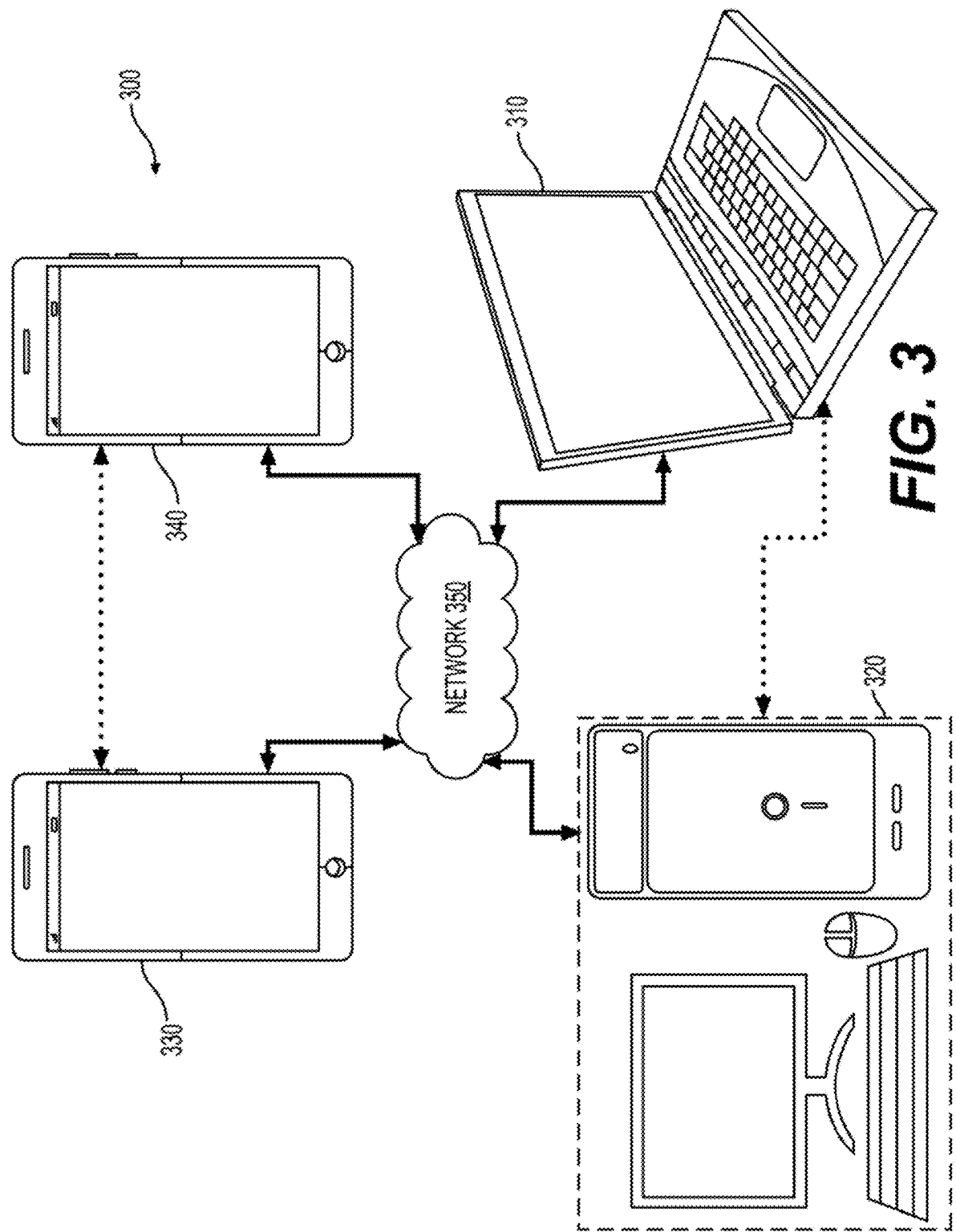
FIG. 3 is a schematic illustration of an exemplary block diagram of a communication system (300).

FIG. 3 illustrates an exemplary block diagram of a communication system (300). The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that perform bidirectional transmission of coded video data, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the example of FIG. 3, the terminal devices (310), (320), (330) and (340) are respectively illustrated as servers, personal computers and smart phones but the principles of the present disclosure may be not so limited. Embodiments of the present disclosure find application with laptop computers, tablet computers, media players, and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
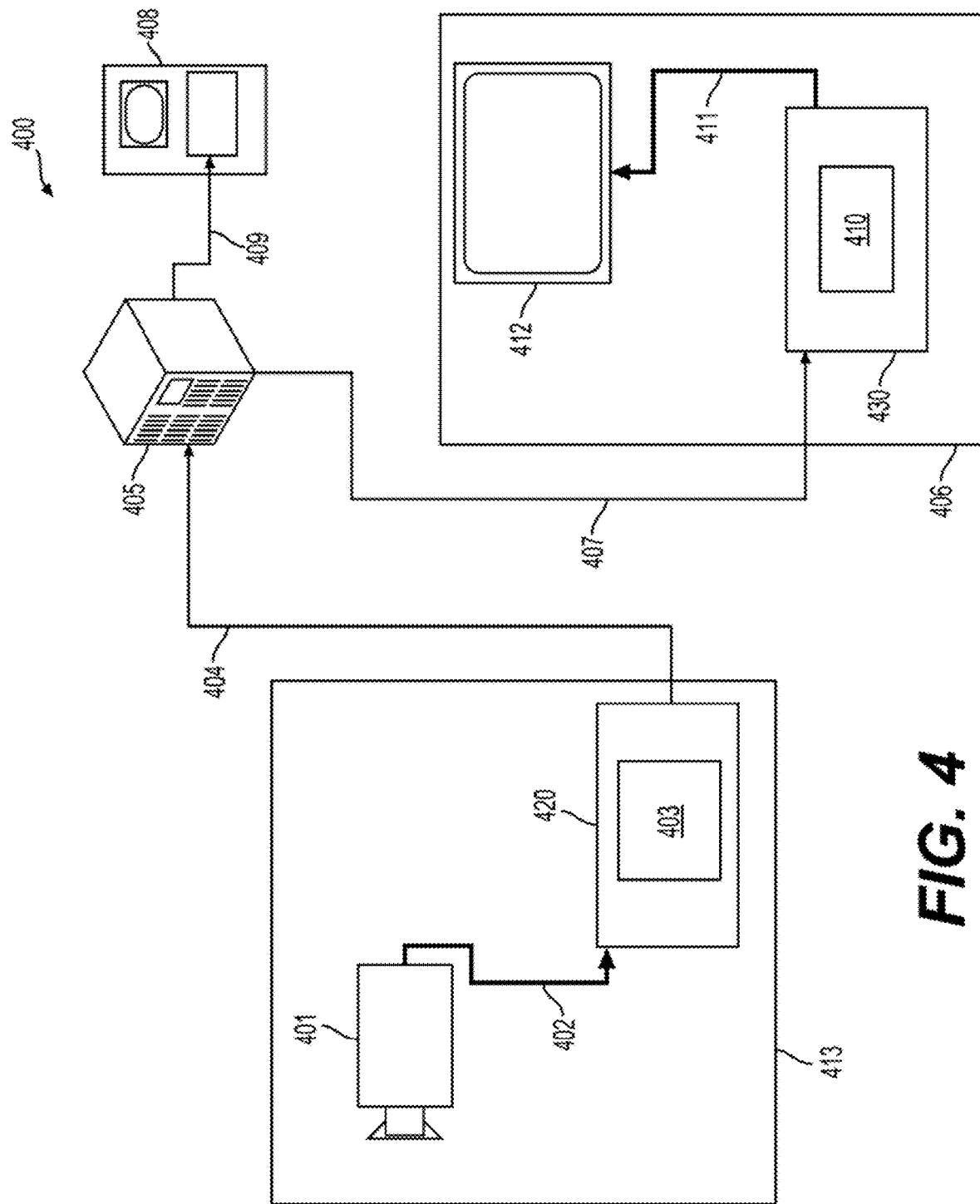
FIG. 4 is a schematic illustration of an exemplary block diagram of a communication system (400).

FIG. 4 illustrates, as an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
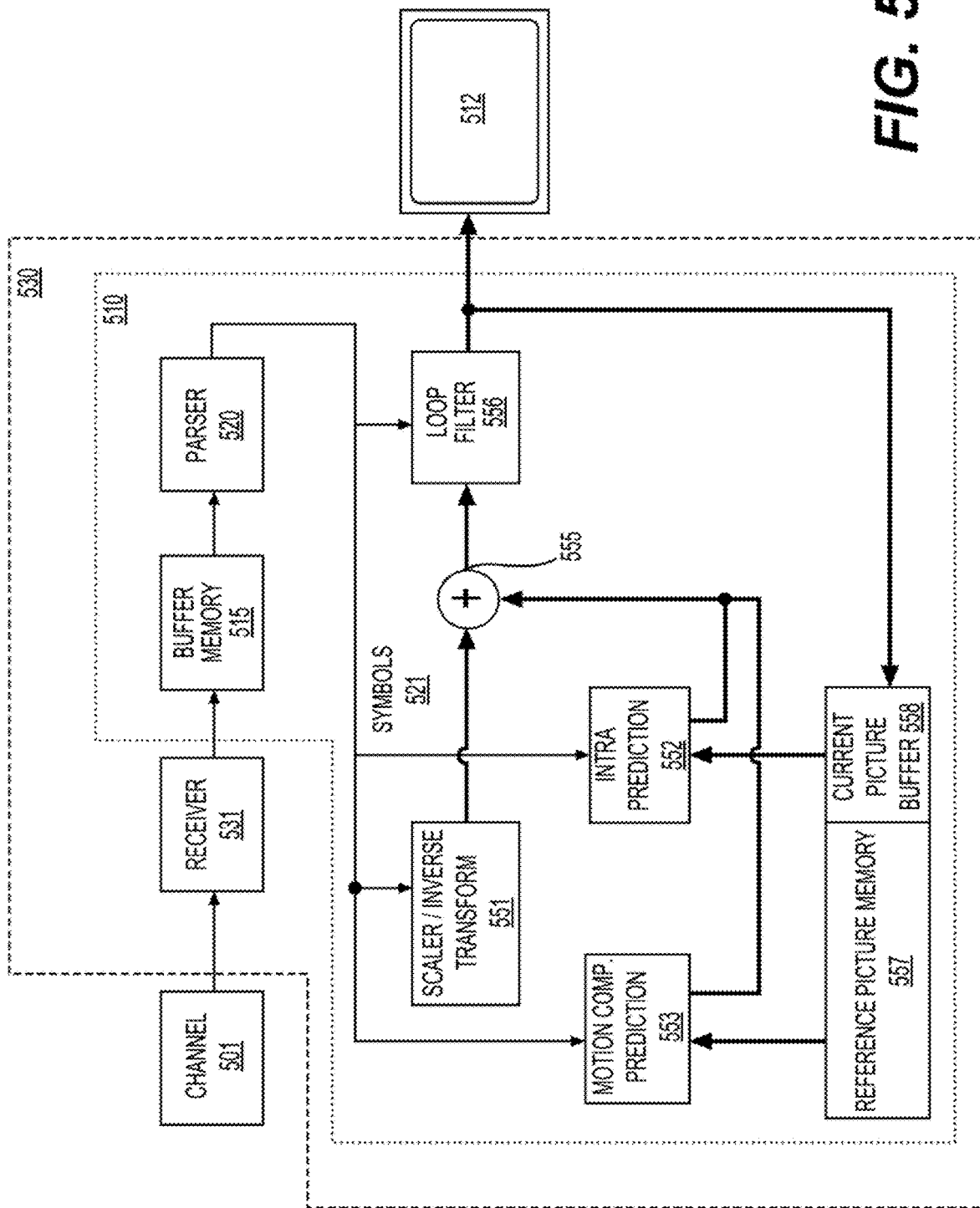
FIG. 5 is a schematic illustration of an exemplary block diagram of a decoder.

FIG. 5 shows an exemplary block diagram of a video decoder (510). The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510). In an embodiment, one coded video sequence is received at a time, where the decoding of each coded video sequence is independent from the decoding of other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as shown in FIG. 5. The control information for the rendering device(s) may be in the form of Supplemental Enhancement Information (SEI) messages or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by subgroup control information parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform unit (551) can pertain to an intra coded block. The intra coded block is a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated, block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520). Video compression can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
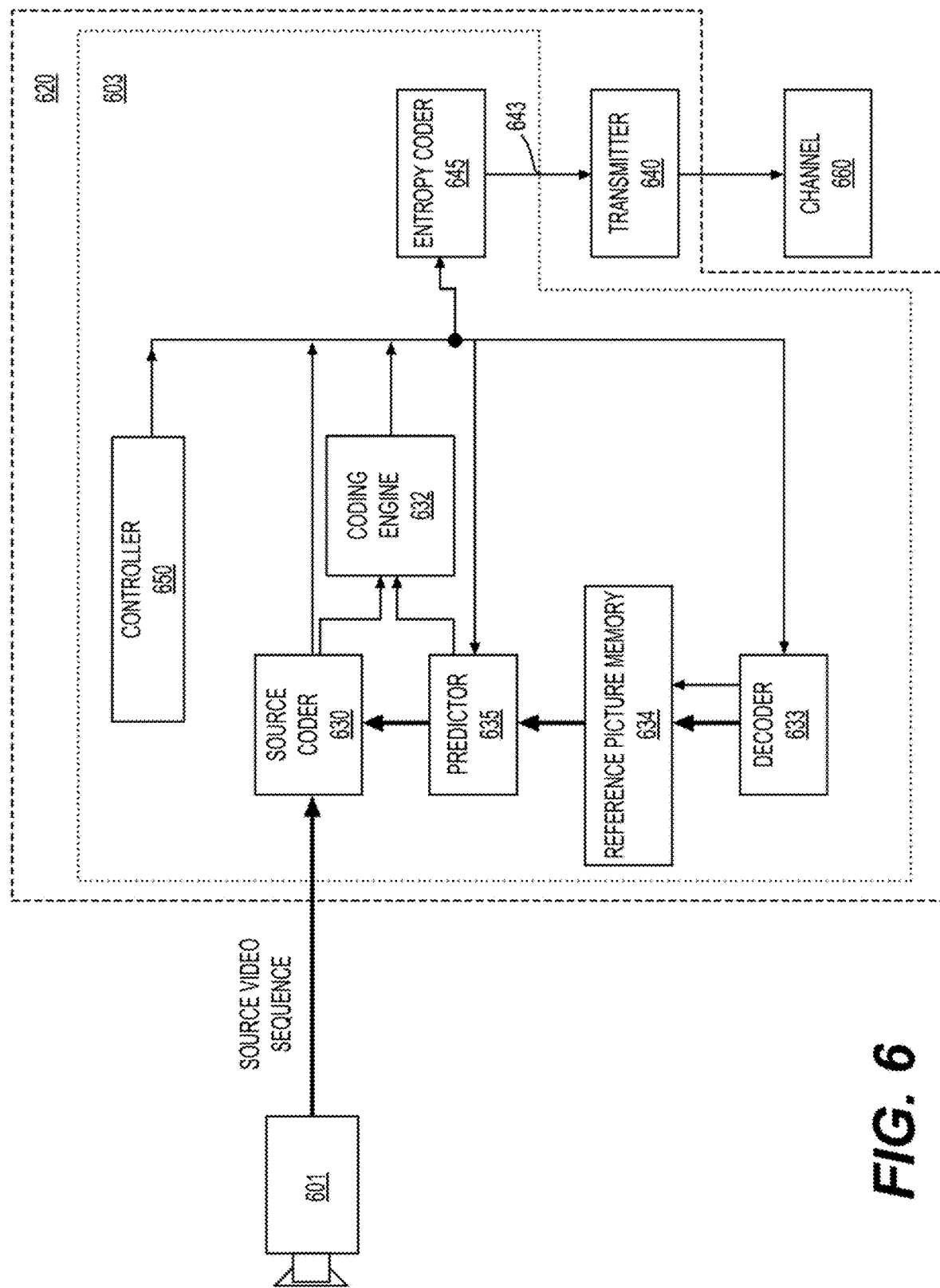
FIG. 6 is a schematic illustration of an exemplary block diagram of an encoder.

FIG. 6 shows an exemplary block diagram of a video encoder (603). The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create. The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture memory (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by applying lossless compression to the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video encoder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
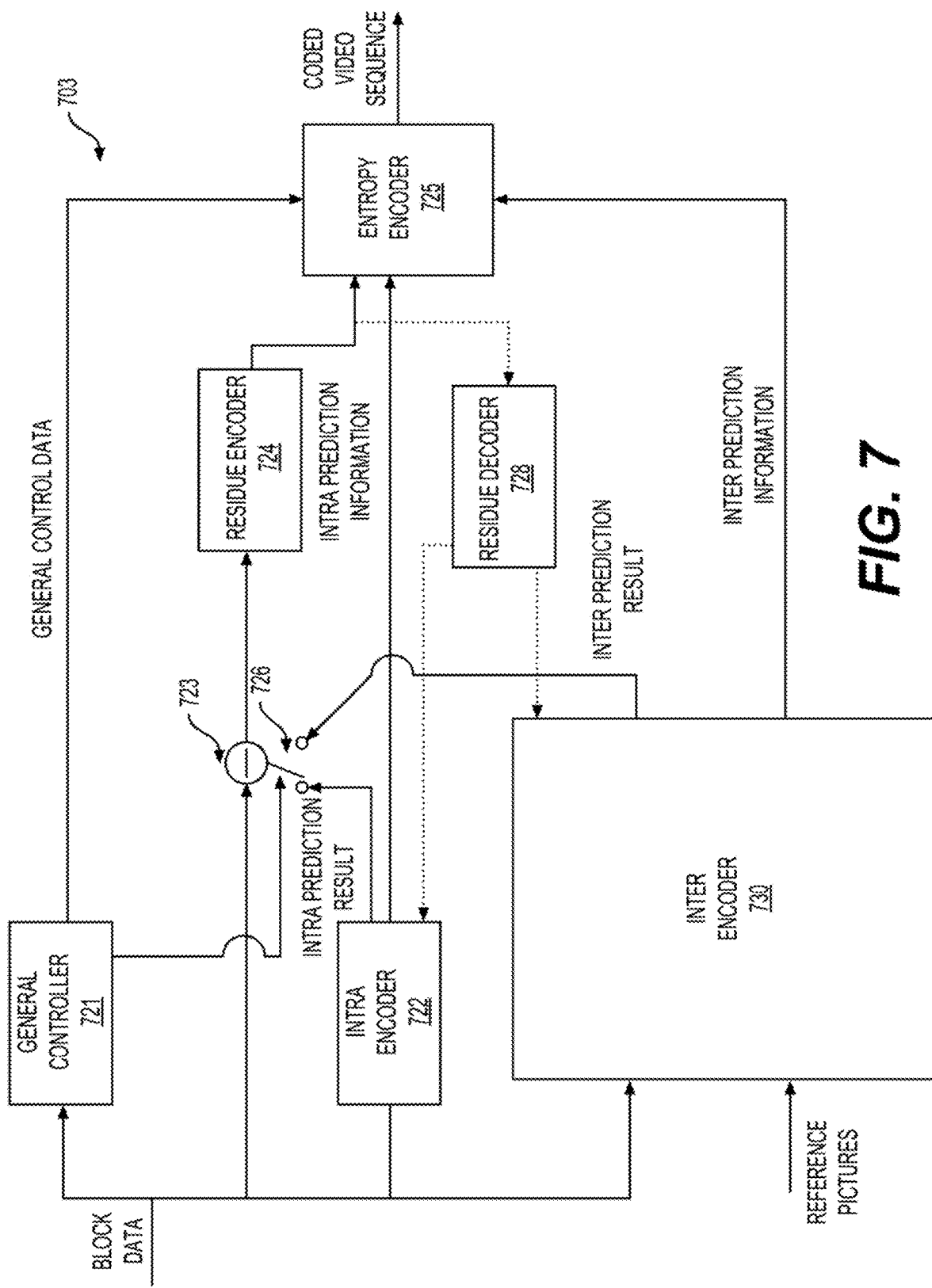
FIG. 7 shows a block diagram of an exemplary encoder.

FIG. 7 shows an exemplary diagram of a video encoder (703). The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes an inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also generate intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information in the bitstream according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
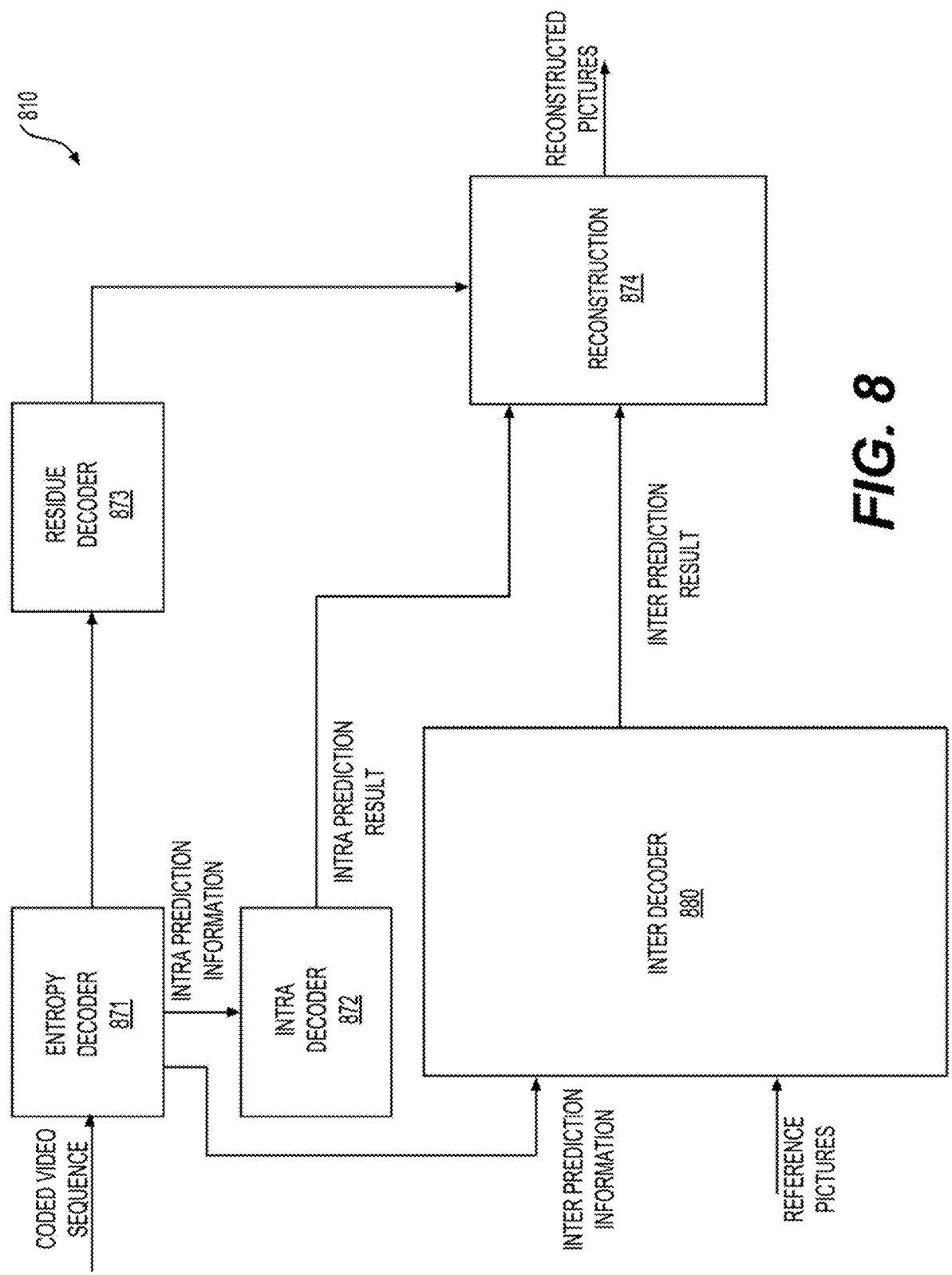
FIG. 8 shows a block diagram of an exemplary decoder.

FIG. 8 shows an exemplary diagram of a video decoder (810). The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode) and prediction information (such as, for example, intra prediction information or inter prediction information) that can identify certain sample or metadata that is used for prediction by the intra decoder (872) or the inter decoder (880), respectively. The symbols can also include residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual information from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual information as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Various inter prediction modes can be used in VVC. For an inter-predicted CU, motion parameters can include MV(s), one or more reference picture indices, a reference picture list usage index, and additional information for certain coding features to be used for inter-predicted sample generation. A motion parameter can be signaled explicitly or implicitly. When a CU is coded with a skip mode, the CU can be associated with a PU and can have no significant residual coefficients, no coded motion vector delta or MV difference (e.g., MVD) or a reference picture index. A merge mode can be specified where the motion parameters for the current CU are obtained from neighboring CU(s), including spatial and/or temporal candidates, and optionally additional information such as introduced in VVC. The merge mode can be applied to an inter-predicted CU, not only for skip mode. In an example, an alternative to the merge mode is the explicit transmission of motion parameters, where MV(s), a corresponding reference picture index for each reference picture list and a reference picture list usage flag and other information are signaled explicitly per CU.

In an embodiment, such as in VVC, VVC Test model (VTM) reference software includes one or more refined inter prediction coding tools that include: an extended merge prediction, a merge motion vector difference (MMVD) mode, an adaptive motion vector prediction (AMVP) mode with symmetric MVD signaling, an affine motion compensated prediction, a subblock-based temporal motion vector prediction (SbTMVP), an adaptive motion vector resolution (AMVR), a motion field storage (1/16th luma sample MV storage and 8×8 motion field compression), a bi-prediction with CU-level weights (BCW), a bi-directional optical flow (BDOF), a prediction refinement using optical flow (PROF), a decoder side motion vector refinement (DMVR), a combined inter and intra prediction (CIIP), a geometric partitioning mode (GPM), and the like. Inter predictions and related methods are described in detail below.

Extended merge prediction can be used in some examples. In an example, such as in VTM4, a merge candidate list is constructed by including the following five types of candidates in order: spatial motion vector predictor(s) (MVP(s)) from spatial neighboring CU(s), temporal MVP(s) from collocated CU(s), history-based MVP(s) (HMVP(s)) from a first-in-first-out (FIFO) table, pairwise average MVP(s), and zero MV(s).

A size of the merge candidate list can be signaled in a slice header. In an example, the maximum allowed size of the merge candidate list is 6 in VTM4. For each CU coded in the merge mode, an index (e.g., a merge index) of a best merge candidate can be encoded using truncated unary binarization (TU). The first bin of the merge index can be coded with context (e.g., context-adaptive binary arithmetic coding (CABAC)) and a bypass coding can be used for other bins.

Figure 9:
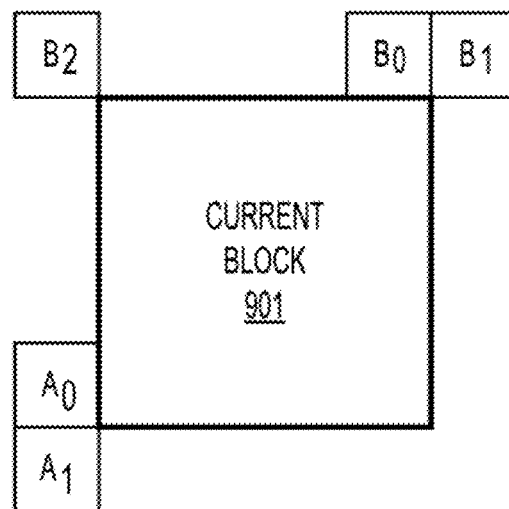
FIG. 9 shows positions of spatial merge candidates according to an embodiment of the disclosure.

Some examples of a generation process of each category of merge candidates are provided below. In an embodiment, spatial candidate(s) are derived as follows. The derivation of spatial merge candidates in VVC can be identical to that in HEVC. In an example, a maximum of four merge candidates are selected among candidates located in positions depicted in FIG. 9. FIG. 9 shows positions of spatial merge candidates according to an embodiment of the disclosure. Referring to FIG. 9, an order of derivation is B1, A1, B0, A0, and B2. The position B2 is considered only when any CU of positions A0, B0, B1, and A1 is not available (e.g., because the CU belongs to another slice or another tile) or is intra coded. After a candidate at the position A1 is added, the addition of the remaining candidates is subject to a redundancy check which ensures that candidates with same motion information are excluded from the candidate list so that coding efficiency is improved.

Figure 10:
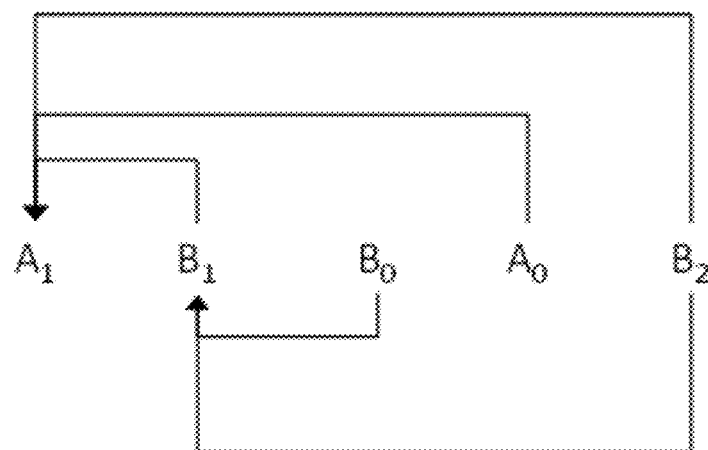
FIG. 10 shows candidate pairs that are considered for a redundancy check of spatial merge candidates according to an embodiment of the disclosure.

To reduce computational complexity, not all possible candidate pairs are considered in the mentioned redundancy check. Instead, only pairs linked with an arrow in FIG. 10 are considered and a candidate is only added to the candidate list if the corresponding candidate used for the redundancy check does not have the same motion information. FIG. 10 shows candidate pairs that are considered for a redundancy check of spatial merge candidates according to an embodiment of the disclosure. Referring to FIG. 10, the pairs linked with respective arrows include A1 and B1, A1 and A0, A1 and B2, B1 and B0, and B1 and B2. Thus, candidates at the positions B1, A0, and/or B2 can be compared with the candidate at the position A1, and candidates at the positions B0 and/or B2 can be compared with the candidate at the position B1.

Figure 11:
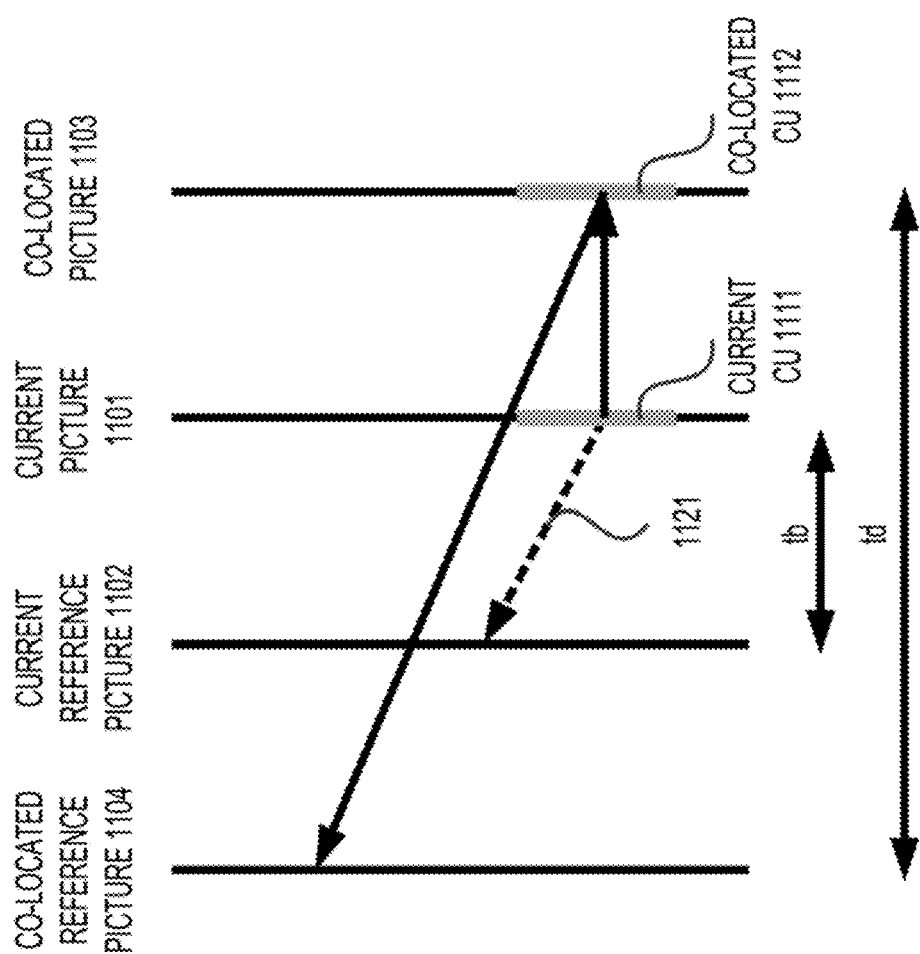
FIG. 11 shows exemplary motion vector scaling for a temporal merge candidate.

In an embodiment, temporal candidate(s) are derived as follows. In an example, only one temporal merge candidate is added to the candidate list. FIG. 11 shows exemplary motion vector scaling for a temporal merge candidate. To derive the temporal merge candidate of a current CU (1111) in a current picture (1101), a scaled MV (1121) (e.g., shown by a dotted line in FIG. 11) can be derived based on a collocated CU (1112) belonging to a collocated reference picture (1104). In an example, the collocated reference picture (also referred to as the collocated picture) is a particular reference picture, for example, used for temporal motion vector prediction. The collocated reference picture used for the temporal motion vector prediction can be indicated by a reference index in a syntax, such as a high-level syntax (e.g., a picture header, a slice header).

A reference picture list used to derive the co-located CU (1112) can be explicitly signaled in a slice header. The scaled MV (1121) for the temporal merge candidate can be obtained as shown by the dotted line in FIG. 11. The scaled MV (1121) can be scaled from the MV of the co-located CU (1112) using picture order count (POC) distances tb and td. The POC distance tb can be defined to be the POC difference between a current reference picture (1102) of the current picture (1101) and the current picture (1101). The POC distance td can be defined to be the POC difference between the collocated reference picture (1104) of the co-located picture (1103) and the co-located picture (1103). A reference picture index of the temporal merge candidate can be set to zero.

Figure 12:
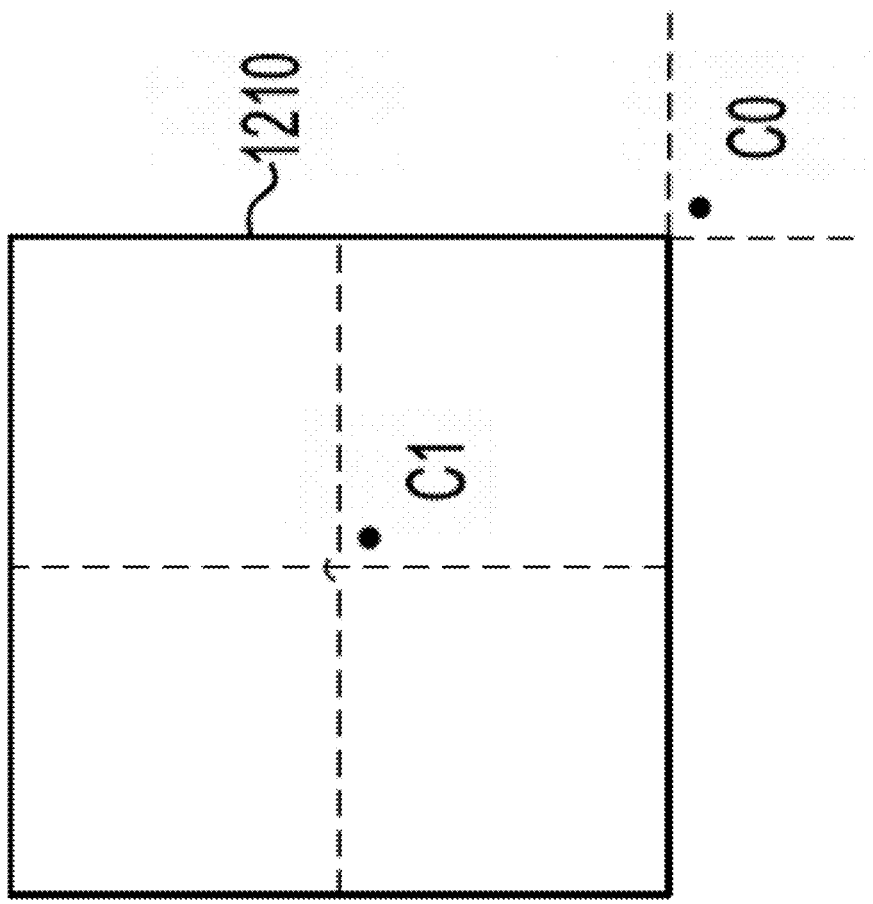
FIG. 12 shows exemplary candidate positions for a temporal merge candidate of a current coding unit.

FIG. 12 shows exemplary candidate positions (e.g., C0 and C1) for a temporal merge candidate of a current CU. A position for the temporal merge candidate can be selected from the candidate positions C0 and C1. The candidate position C0 is located at a bottom-right corner of a co-located CU (1210) of the current CU. The candidate position C1 is located at a center of the co-located CU (1210) of the current CU. If a CU at the candidate position C0 is not available, is intra coded, or is outside of a current row of CTUs, the candidate position C1 is used to derive the temporal merge candidate. Otherwise, for example, the CU at the candidate position C0 is available, intra coded, and in the current row of CTUs, the candidate position C0 is used to derive the temporal merge candidate.

A merge with motion vector difference (MMVD) mode can be used for a skip mode or a merge mode with a motion vector expression method. Merge candidate(s), such as used in VVC, can be reused in the MMVD mode. A candidate can be selected among the merge candidates as a starting point (e.g., an MV predictor (MVP)), and can be further expanded by the MMVD mode. The MMVD mode can provide a new motion vector expression with simplified signaling. The motion vector expression method includes the starting point and an MV difference (MVD). In an example, the MVD is indicated by a magnitude (or a motion magnitude) of the MVD, and a direction (e.g., a motion direction) of the MVD.

The MMVD mode can use a merge candidate list, such as used in VVC. In an embodiment, only candidate(s) which are of a default merge type (e.g., MRG_TYPE_DEFAULT_N) are considered for the MMVD mode. The starting point can be indicated or defined by a base candidate index (IDX). The base candidate index can indicate a candidate (e.g., the best candidate) among the candidates (e.g., the base candidates) in the merge candidate list. Table 1 shows an exemplary relationship between the base candidate index and the corresponding starting point. The base candidate index being 0, 1, 2, or 3 indicates the corresponding starting point being a $1^{st}$ MVP, a $2^{nd}$ MVP, a $3^{rd}$ MVP or a $4^{th}$ MVP. In an example, if a number of the base candidate(s) is equal to 1, the base candidate IDX is not signaled.

TABLE 1

| Base candidate IDX | | | | |
| --- | --- | --- | --- | --- |
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

A distance index can indicate motion magnitude information of the MVD, such as the magnitude of the MVD. For example, the distance index indicates a distance (e.g., a pre-defined distance) from the starting point (e.g., the MVP indicated by the base candidate index). In an example, the distance is one of a plurality of pre-defined distances, such as shown in Table 2. Table 2 shows an exemplary relationship between the distance index and the corresponding distance (in units of samples or pixels). 1 pel in Table 2 is one sample or one pixel. For example, the distance index being 1 indicates the distance to be ½-pel or ½ samples.

TABLE 2

| Distance IDX | | | | | | | | |
|---|---|---|---|---|---|---|---|---|
| Distance IDX | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

A direction index can represent the direction of the MVD relative to the starting point. The direction index can represent one of a plurality of directions, such as four directions as shown in Table 3. For example, the direction index being 00 indicates the direction of the MVD being along the positive x-axis.

TABLE 3

| Direction IDX | | | | |
|---|---|---|---|---|
| Direction IDX | 00 | 01 | 10 | 11 |
| x-axis | + | − | N/A | N/A |
| y-axis | N/A | N/A | + | − |

An MMVD flag can be signaled after sending a skip and merge flag. If the skip and merge flag is true, the MMVD flag can be parsed. In an example, if the MMVD flag is equal to 1, MMVD syntaxes (e.g., including a distance index and/or a direction index) can be parsed. If the MMVD flag is not equal to 1, an AFFINE flag can be parsed. If the AFFINE flag is equal to 1, the AFFINE mode is used to code the current block. If the AFFINE flag is not equal to 1, a skip/merge index can be parsed for a skip/merge mode, such as used in VTM.

Figure 13:
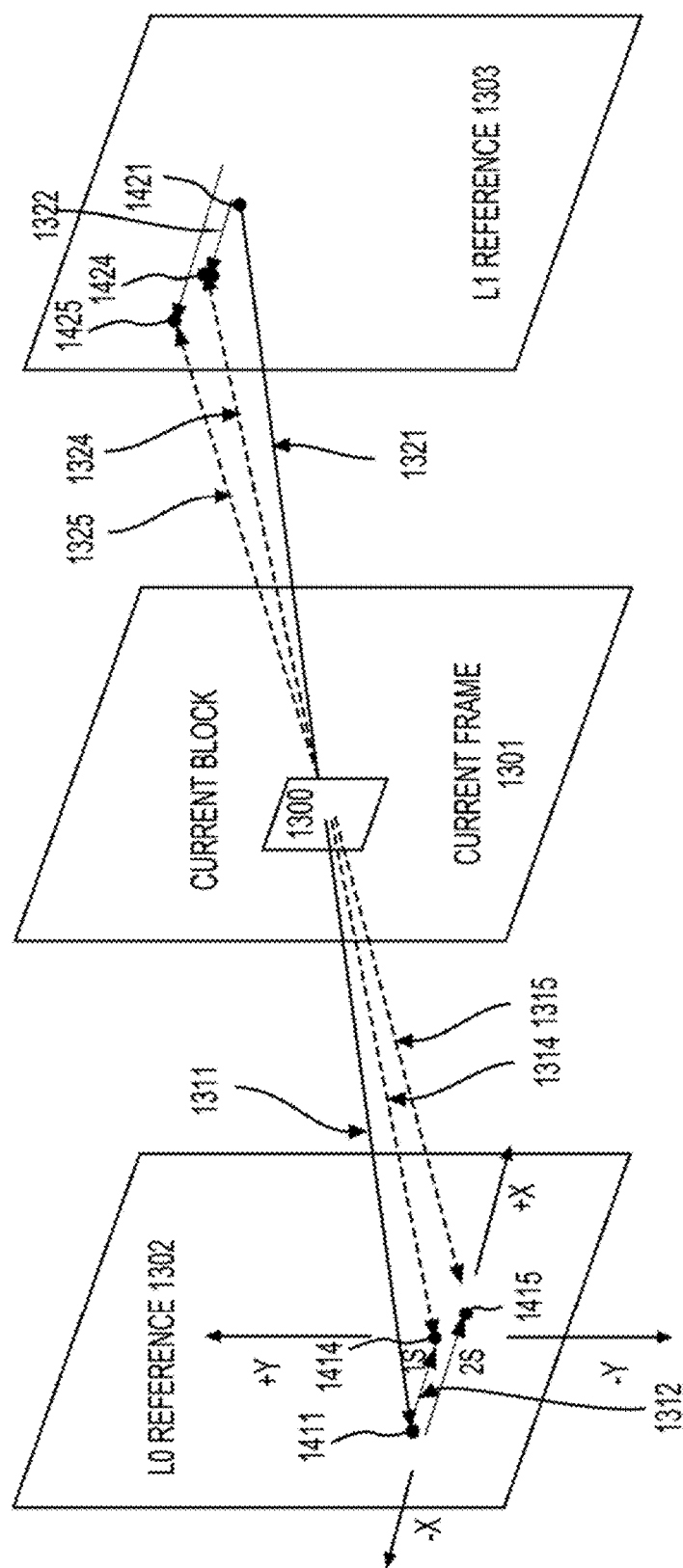
FIGS. 13-14 show an example of a search process in a merge motion vector difference (MMVD) mode.
Figure 14:
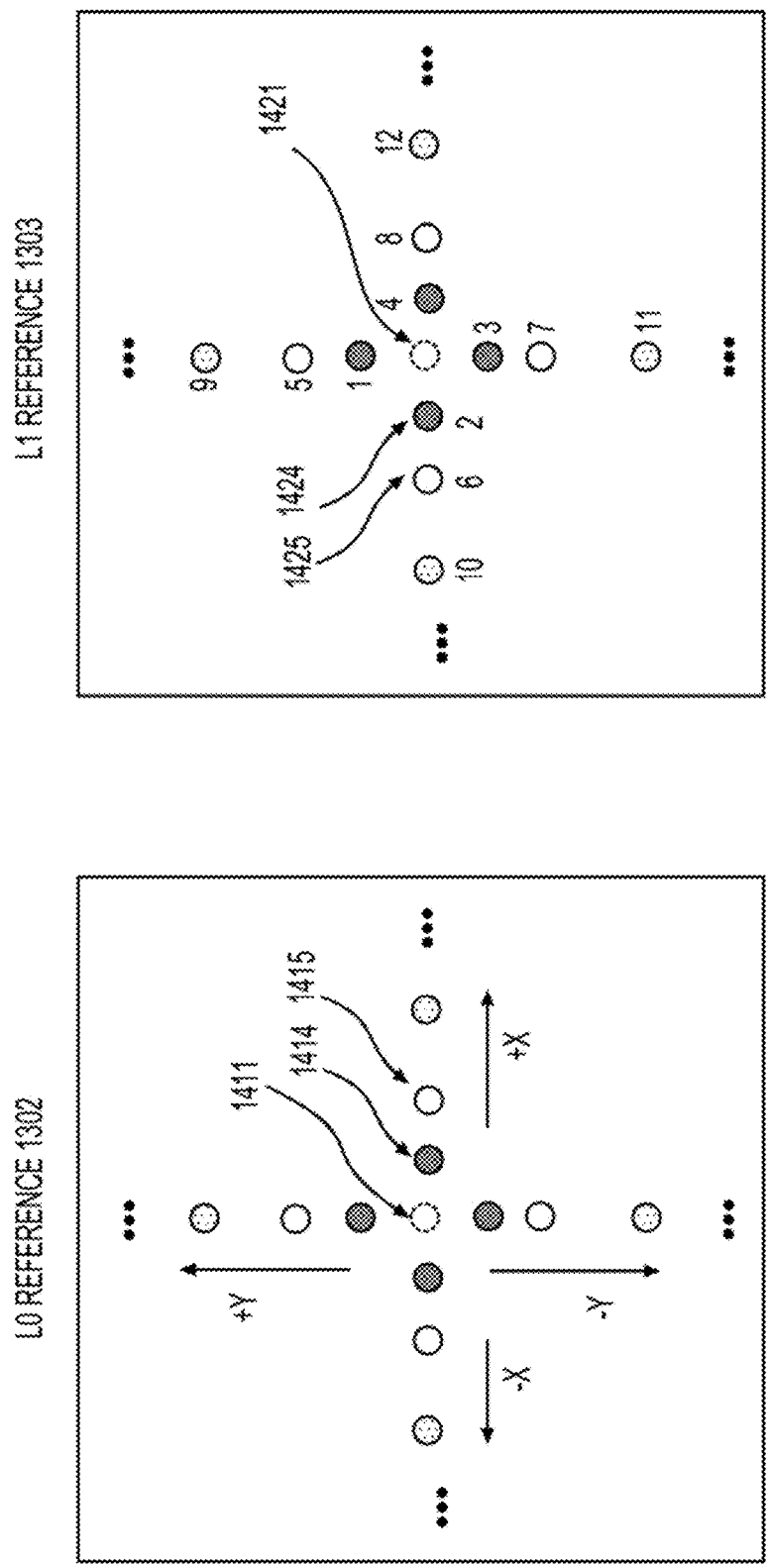

FIGS. 13-14 show an example of a search process in the MMVD mode. By performing the search process, indices including a base candidate index, a direction index, and/or a distance index can be determined for a current block (1300) in a current picture (or referred to as a current frame) (1301).

A first motion vector (MV) (1311) and a second MV (1321) belonging to a first merge candidate are shown. The first merge candidate can be a merge candidate in a merge candidate list constructed for the current block (1300). The first and second MVs (1311) and (1321) can be associated with two reference pictures (1302) and (1303) in reference picture lists L0 and L1, respectively. Accordingly, two starting points (1411) and (1421) in FIGS. 13-14 can be determined at the reference pictures (1302) and (1303), respectively.

In an example, based on the starting points (1411) and (1421), multiple predefined points (e.g., 1-12 shown in FIG. 14) extending from the starting points (1411) and (1421) in vertical directions (represented by +Y, or −Y) or horizontal directions (represented by +X and −X) in the reference pictures (1302) and (1303) can be evaluated. In one example, a pair of points mirroring each other with respect to the respective starting point (1411) or (1421), such as the pair of points (1414) and (1424), or the pair of points (1415) and (1425), can be used to determine a pair of MVs (1314) and (1324) or a pair of MVs (1315) and (1325) which may form MV predictor (MVP) candidates for the current block (1300). The MVP candidates determined based on the predefined points surrounding the starting points (1411) and/or (1421) can be evaluated. Referring to FIG. 13, an MVD (1312) between the first MV (1311) and the MV (1314) has a magnitude of 1 S. An MVD (1322) between the second MV (1321) and the MV (1324) has a magnitude of 1 S.

Similarly, an MVD between the first MV (1311) and the MV (1315) has a magnitude of 2 S. An MVD between the second MV (1321) and the MV (1325) has a magnitude of 2 S.

In addition to the first merge candidate, other available or valid merge candidates in the merge candidate list of the current block (1300) can also be evaluated similarly. In one example, for a uni-predicted merge candidate, only one prediction direction associated with one of the two reference picture lists is evaluated.

In an example, based on the evaluations, a best MVP candidate can be determined. Accordingly, a best merge candidate corresponding to the best MVP candidate can be selected from the merge list, and a motion direction and a motion distance can also be determined. For example, based on the selected merge candidate and the Table 1, a base candidate index can be determined. Based on the selected MVP, such as that corresponding to the predefined point (1415) (or (1425)), a direction and a distance (e.g., 2 S) of the point (1415) with respect to the starting point (1411) can be determined. According to Table 2 and Table 3, a direction index and a distance index can accordingly be determined.

As described above, two indices, such as a distance index and a direction index can be used to indicate an MVD in the MMVD mode. Alternatively, a single index can be used to indicate an MVD in the MMVD mode, for example, with a table that pairs the single index with the MVD.

Template matching (TM) based candidate reordering can be used in some prediction modes, such as the MMVD mode and an affine MMVD mode. In an embodiment, MMVD offsets are extended for the MMVD mode and the affine MMVD mode. FIG. 15 shows additional refinement positions along multiple diagonal angles, such as k×π/8 diagonal angles where k is an integer from 0 to 15. The additional refinement positions along the multiple diagonal angles can increase a number of directions, for example, from 4 directions (e.g., +X, −X, +Y, and −Y) to 16 directions (e.g., k=0, 1, 2, ..., 15). In an example, each of the 16 directions is represented by an angle between the +X direction and a direction indicated by a center point (1500) and one of points 1-16. For example, the point 1 indicates +X direction with an angle of 0 (i.e., k=0), the point 2 indicates a direction along an angle of 1×π/8 (i.e., k=1), and the like.

The TM can be performed in the MMVD mode. In an example, for each MMVD refinement position, a TM cost can be determined based on a current template of a current block and one or more reference templates. The TM cost can be determined using any method, such as a sum of absolute difference (SAD) (e.g., an SAD cost), a sum of absolute transformed differences (SATD), sum of squared errors (SSE), a mean removed SAD/SATD/SSE, a variance, a partial SAD, a partial SSE, a partial SATD, or the like.

The current template of the current block can include any suitable samples, such as one row of samples above the current block and/or one column of samples to the left of the current block. Based on the TM costs (e.g., SAD costs) between the current template and corresponding reference templates for the refinement positions, MMVD refinement positions, for example, all possible MMVD refinement positions (e.g., 16×6 representing 16 directions and 6 magnitudes) for each base candidate (e.g., an MVP) can be reordered. In an example, top MMVD refinement positions with the smallest TM costs (e.g., the smallest SAD costs) are kept as available MMVD refinement positions for MMVD index coding. For example, a subset (e.g., 8) of the MMVD refinement positions with the smallest TM costs is used for the MMVD index coding. For example, an MMVD index indicates which one of the subset of the MMVD refinement positions with the smallest TM costs is selected to code the current block. In an example, an MMVD index of 0 indicates that an MVD (e.g., an MMVD refinement position) that corresponds to the smallest TM cost is used to code the current block. The MMVD index can be binarized, for example, by the Rice code with a parameter equal to 2.

In an embodiment, in addition to the MMVD offset extension described above, such as in FIG. 15, an affine MMVD reordering is extended where additional refinement positions along k×π/4 diagonal angles are added. After reordering, top ½ refinement positions with the smallest TM costs (e.g., SAD costs) are kept to code the current block.

Figure 16B:
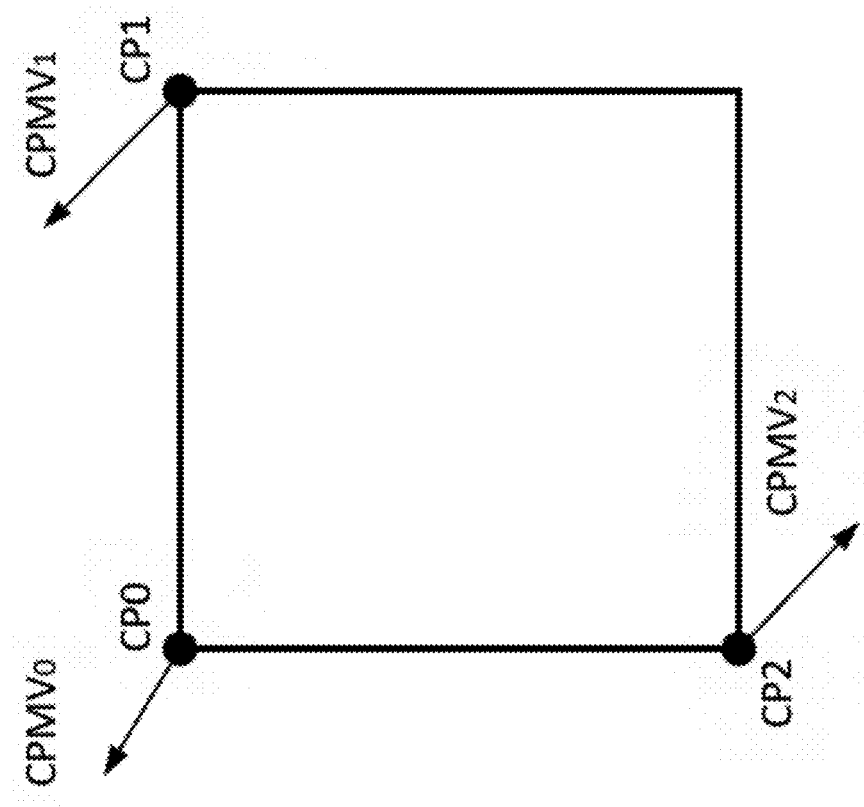
FIG. 16B shows an example of a 6-parameter affine motion model.
Figure 16A:
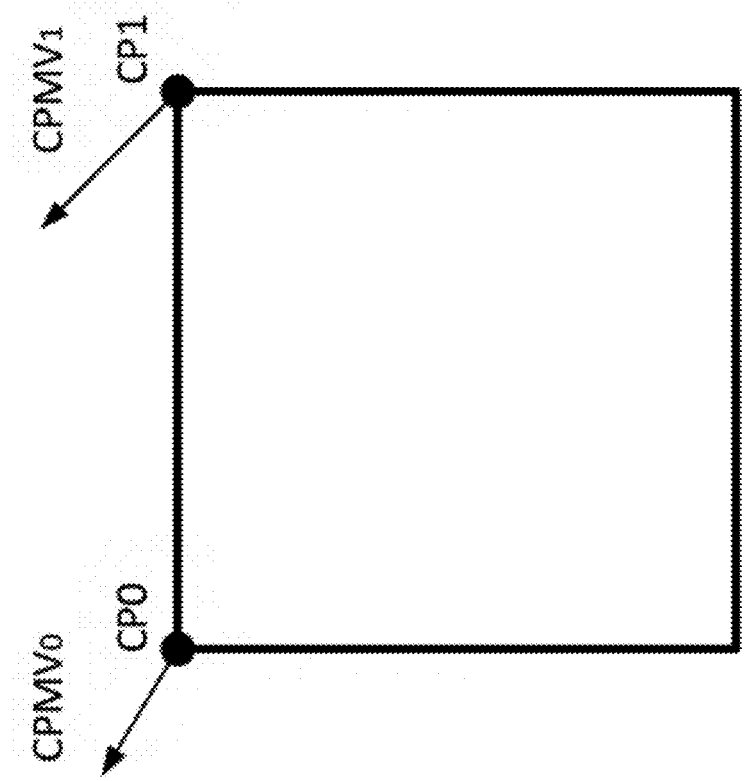
FIG. 16A shows an example of a 4-parameter affine motion model.

In some embodiments, a block-based affine transform motion compensation prediction is applied. In FIG. 16A, an affine motion field of a block is described by two control point motion vectors (CPMVs), CPMV0 and CPMV1, of two control points (CPs), CP0 and CP1 when a 4-parameter affine model is used. In FIG. 16B, an affine motion field of a block is described by three CPMVs, CPMV0, CPMV1 and CPMV3, of CPs, CP0, CP1, and CP2 when a 6-parameter affine model is used.

For a 4-parameter affine motion model, a motion vector at a sample location (x, y) in a block is derived as:

$$\begin{cases} mv_x = \frac{mv_{1x} - mv_{0x}}{W}x + \frac{mv_{1y} - mv_{0y}}{W}y + mv_{0x} \\ mv_y = \frac{mv_{1y} - mv_{0y}}{W}x + \frac{mv_{1y} - mv_{0x}}{W}y + mv_{0y} \end{cases} \quad \text{Eq. 3}$$

For a 6-parameter affine motion model, a motion vector at sample location (x, y) in a block is derived as:

$$\begin{cases} mv_x = \frac{mv_{1x} - mv_{0x}}{W}x + \frac{mv_{2x} - mv_{0x}}{H}y + mv_{0x} \\ mv_y = \frac{mv_{1y} - mv_{0y}}{W}x + \frac{mv_{2y} - mv_{0y}}{H}y + mv_{0y} \end{cases} \quad \text{Eq. 4}$$

In Eqs. 3-4, $(mv_{0x}, mv_{0y})$ is a motion vector of the top-left corner control point, $(mv_{1x}, mv_{1y})$ is motion vector of the top-right corner control point, and $(mv_{2x}, mv_{2y})$ is motion vector of the bottom-left corner control point. In addition, the coordinate (x, y) is with respect to the top-left corner of the respective block, and W and H denotes the width and height of the respective block.

Figure 17:
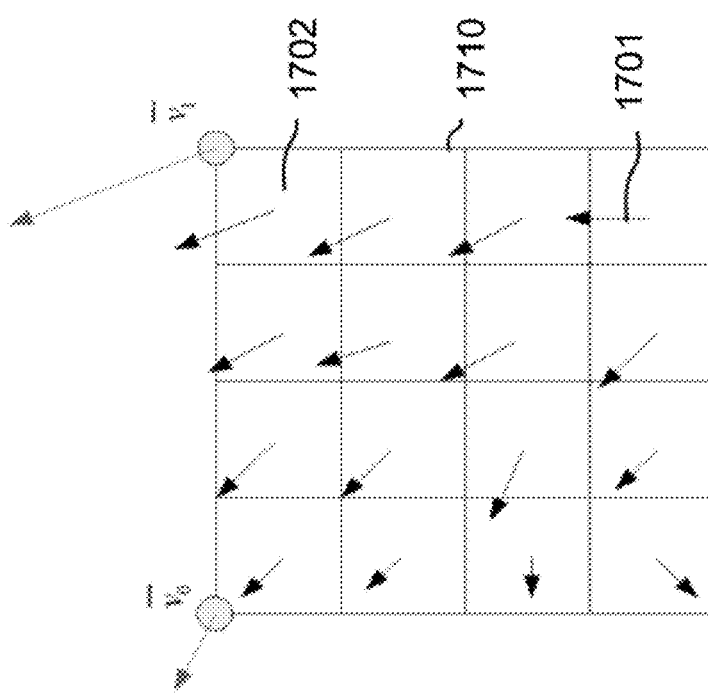
FIG. 17 shows an example of a sub-block based affine transform prediction.

In order to simplify the motion compensation prediction, a sub-block based affine transform prediction is applied in some embodiments. For example, in FIG. 17, the 4-parameter affine motion model is used, and two CPMVs, $\vec{v}_0$ and $\vec{v}_1$, are determined. To derive a motion vector of each 4×4 (samples) luma sub-block (1702) partitioned from the current block (1710), a motion vector (1701) of the center sample of each sub-block (1702) is calculated according to Eq. 3, and rounded to a 1/16 fraction accuracy. Then, motion compensation interpolation filters are applied to generate a prediction of each sub-block (1702) with the derived motion vector (1701). The sub-block size of chroma-components is set to be 4×4. A MV of a 4×4 chroma sub-block is calculated as the average of the MVs of the four corresponding 4×4 luma sub-blocks.

Similar to translational motion inter prediction, two affine motion inter prediction modes including an affine merge mode and an affine AMVP mode are employed in some embodiments. An affine skip mode is similar to the affine merge mode except that residues may be added to predicted samples in the affine merge mode, and no residues are added to predicted samples in the affine skip mode. In the affine skip mode, no significant residual coefficients are used.

In some embodiments, an affine merge mode can be applied for CUs with both width and height larger than or equal to 8. Affine merge candidates of a current CU can be generated based on motion information of spatial neighboring CUs. There can be up to five affine merge candidates and an index is signaled to indicate the one to be used for the current CU. For example, the following three types of affine merge candidates are used to form an affine merge candidate list:

Inherited affine merge candidates that are extrapolated from CPMVs of the neighbor CUs;
Constructed affine merge candidates that are derived using the translational MVs of the neighbor CUs; and
Zero MVs.

In some embodiments, there can be at most two inherited affine candidates which are derived from affine motion models of the neighboring blocks, one from left neighboring CUs and one from above neighboring CUs. The candidate blocks, for example, can be located at positions shown in FIG. 9. For the left predictor, the scan order is A0>A1, and for the above predictor, the scan order is B0>B1>B2. Only the first inherited candidate from each side is selected. No pruning check is performed between two inherited candidates.

Figure 18:
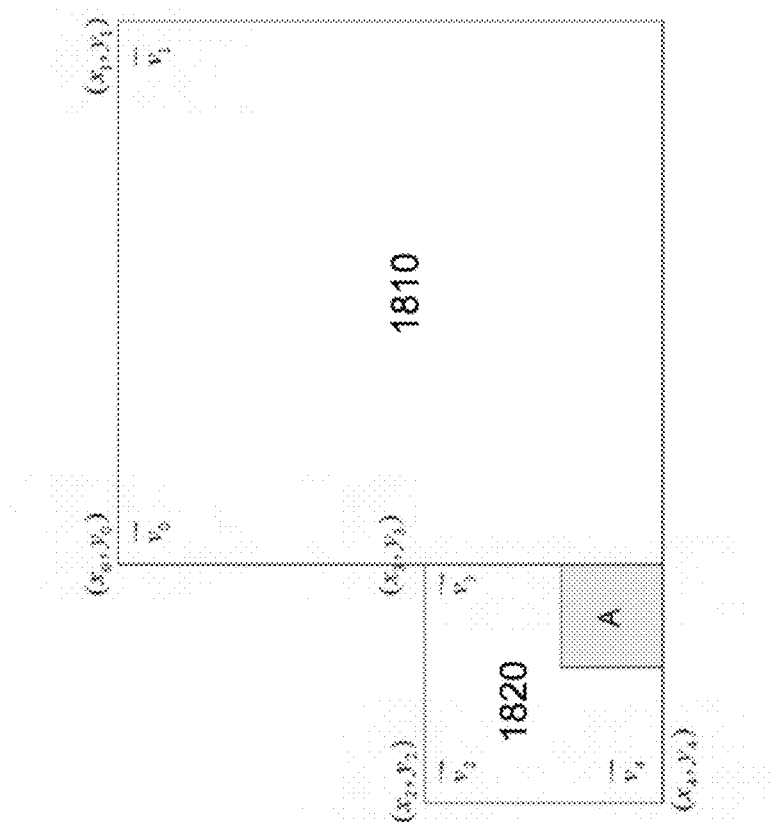
FIG. 18 shows an example of determining a control point motion vector (CPMV) candidate in an affine merge list of a current CU.

When a neighboring affine CU is identified, CPMVs of the identified neighboring affine CU are used to derive a CPMV candidate in the affine merge list of the current CU. As shown in FIG. 18, a neighbor left bottom block A of a current CU (1810) is coded in an affine mode. Motion vectors, $\vec{v}_2$, $\vec{v}_3$ and $\vec{v}_4$ of the top left corner, above right corner and left bottom corner of a CU (1820) which contains the block A are attained. When block A is coded with a 4-parameter affine model, two CPMVs $\vec{v}_0$ and $\vec{v}_1$ of the current CU (1810) are calculated according to $\vec{v}_2$, and $\vec{v}_3$. In case that block A is coded with 6-parameter affine model, three CPMVs (not shown) of the current CU are calculated according to $\vec{v}_2$, $\vec{v}_3$ and $\vec{v}_4$.

Figure 19:
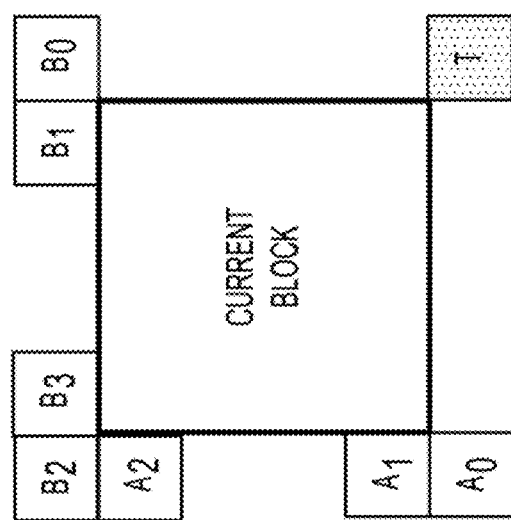
FIG. 19 shows examples of spatial neighbors and a temporal neighbor of a current block.

Constructed affine candidates are constructed by combining neighbor translational motion information of each control point. The motion information for the control points is derived from specified spatial neighbors and temporal neighbor shown in FIG. 19. CPMVk (k=1, 2, 3, 4) represents the k-th control point. For CPMV1, the B2>B3>A2 blocks are checked in order and the MV of the first available block is used. For CPMV2, the B1>B0 blocks are checked and for CPMV3, the A1>A0 blocks are checked. A TMVP at block T is used as CPMV4 if available.

After MVs of four control points are attained, affine merge candidates are constructed based on that motion information. The following combinations of control point MVs are used to construct in order: {CPMV1, CPMV2, CPMV3}, {CPMV1, CPMV2, CPMV4}, {CPMV1,

CPMV3, CPMV4}, {CPMV2, CPMV3, CPMV4}, {CPMV1, CPMV2}, {CPMV1, CPMV3}.

The combination of 3 CPMVs constructs a 6-parameter affine merge candidate and the combination of 2 CPMVs constructs a 4-parameter affine merge candidate. To avoid a motion scaling process, if the reference indices of control points are different, the related combination of control point MVs is discarded.

After inherited affine merge candidates and constructed affine merge candidates are checked, if the list is still not full, zero MVs are inserted to the end of the merge candidate list.

To improve the coding efficiency and reduce the transmission overhead of MV(s), a subblock level MV refinement can be applied to extend a CU level temporal motion vector prediction (TMVP). In an example, a subblock-based TMVP (SbTMVP) mode allows inheriting motion information at a subblock-level from a collocated reference picture. As described above, the collocated reference picture can be indicated by a reference index in a syntax, such as a high-level syntax (e.g., a picture header, a slice header).

Each subblock of a current CU (e.g., a current CU with a large size) in a current picture can have respective motion information without explicitly transmitting a block partition structure or the respective motion information. In the SbTMVP mode, motion information for each subblock can be obtained as follows, for example, in three steps. In the first step, a displacement vector (DV) of the current CU can be derived. The DV can indicate a block in the collocated reference picture, for example, the DV points from the current block in the current picture to the block in the collocated reference picture. Thus, the block indicated by the DV is considered as being collocated with the current block and is referred to as a collocated block of the current block. In the second step, availability of an SbTMVP candidate can be checked and a central motion (e.g., a central motion of the current CU) can be derived. In the third step, subblock motion information can be derived from a corresponding subblock in the collocated block using the DV. The three steps can be combined into one or two steps, and/or an order of the three steps may be adjusted.

Unlike TMVP candidate derivation which derives temporal MVs from a collocated block in a reference frame or a reference picture, in the SbTMVP mode, a DV (e.g., a DV derived from an MV of a left neighboring CU of the current CU) can be applied to locate a corresponding subblock in a collocated reference picture for each subblock in the current CU that is in the current picture.

If the corresponding subblock is not inter-coded, motion information of the current subblock can be set to be the central motion of the collocated block.

The SbTMVP mode can be supported by various video coding standards including for example VVC. Similar to the TMVP mode, for example, in HEVC, in the SbTMVP mode, a motion field (also referred to as a motion information field or an MV field) in the collocated reference picture can be used to improve MV prediction and a merge mode for CUs in the current picture. In an example, the same collocated reference picture used by the TMVP mode is used in the SbTMVP mode. In an example, the SbTMVP mode differs from the TMVP mode in the following aspects: (i) the TMVP mode predicts motion information at the CU level while the SbTMVP mode predicts motion information at a sub-CU level; (ii) the TMVP mode fetches the temporal MVs from the collocated block in the collocated reference picture (e.g., the collocated block is the bottom-right or a center block relative to the current CU) while the SbTMVP mode can apply a motion shift before fetching the temporal motion information from the collocated reference picture. In an example, the motion shift used in the SbTMVP mode is obtained from an MV of one of spatial neighboring blocks of the current CU.

Figure 20:
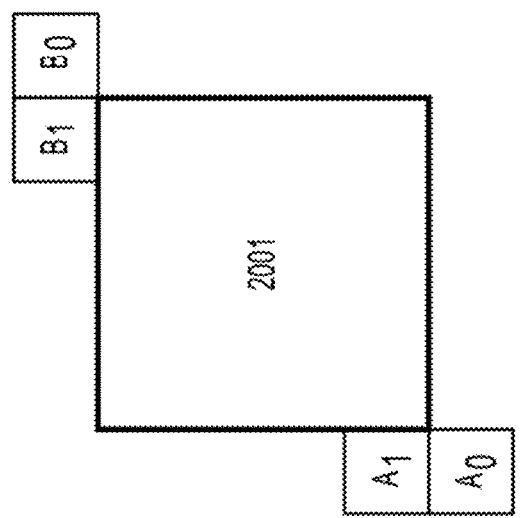
FIGS. 20-21 show an exemplary subblock-based temporal motion vector prediction (SbTMVP) process used in an SbTMVP mode.
Figure 21:
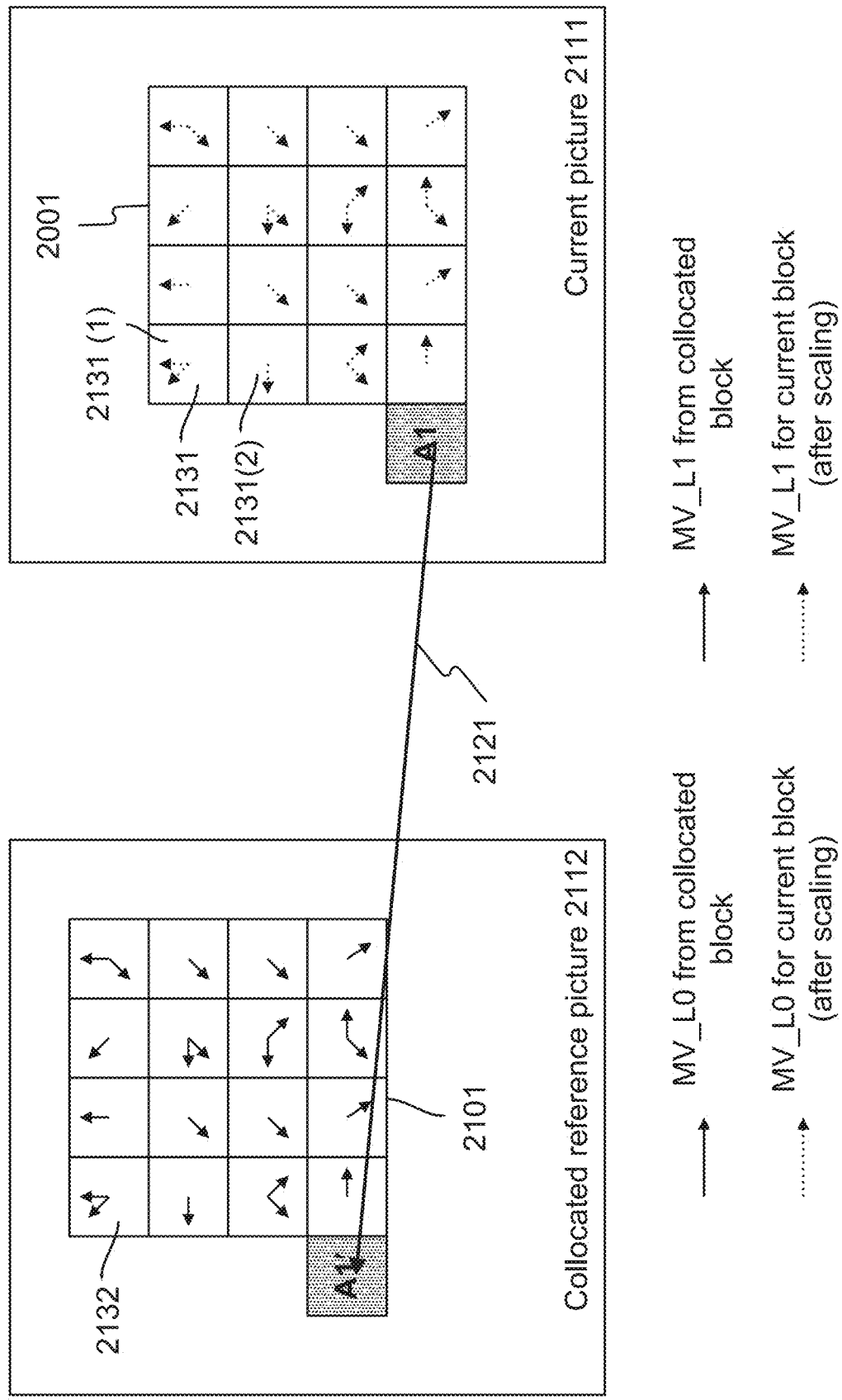

FIGS. 20-21 show an exemplary SbTMVP process used in the SbTMVP mode. The SbTMVP process can predict MVs of sub-CUs (e.g., subblocks) within a current CU (e.g., a current block) (2001) in a current picture (2111), for example, in two steps. In the first step, a spatial neighbor (e.g., A1) of the current block (2001) in FIGS. 20-21 is examined. If the spatial neighbor (e.g., A1) has an MV (2121) that uses a collocated reference picture (2112) as a reference picture of the spatial neighbor (e.g., A1), the MV (2121) can be selected to be a motion shift (or a DV) to be applied to the current block (2001). If no such MV (e.g., an MV that uses the collocated reference picture (2112) as a reference picture) is identified, the motion shift or the DV can be set to a zero MV (e.g., (0, 0)). In some examples, MV(s) of additional spatial neighbors, such as A0, B0, B1, and the like are checked if no such MV is identified for the spatial neighbor A1.

In the second step, the motion shift or the DV (2121) identified in the first step can be applied to the current block (2001) (e.g., the DV (2121) is added to coordinates of the current block) to obtain sub-CU level motion information (e.g., including MVs and reference indices) from the collocated reference picture (2112). In the example shown in FIG. 21, the motion shift or the DV (2121) is set to be the MV of the spatial neighbor A1 (e.g., a block A1) of the current block (2001). For each sub-CU or subblock (2131) in the current block (2001), motion information of a corresponding collocated block (2101) (e.g., motion information of the smallest motion grid that covers a center sample of the collocated block (2101)) in the collocated reference picture (2112) can be used to derive the motion information for the sub-CU or subblock (2131). After the motion information of the collocated sub-CU (2132) in the collocated block (2101) is identified, the motion information of the collocated sub-CU (2132) can be converted to the motion information (e.g., MV(s) and one or more reference indices) of the current sub-CU (2131), for example, using a scaling method, such as in a similar way as the TMVP process used in HEVC, where temporal motion scaling is applied to align reference pictures of temporal MVs to reference pictures of a current CU.

The motion field of the current block (2001) derived based on the DV (2121) can include motion information of each subblock (2131) in the current block (2001), such as MV(s) and one or more associated reference indices. The motion field of the current block (2001) can also be referred to as an SbTMVP candidate and corresponds to the DV (2121).

FIG. 21 shows an example of the motion field or the SbTMVP candidate (also referred to as the SbTMVP merge candidate) of the current block (2001). The motion information of the subblock (2131(1)) that is bi-predicted includes a first MV, a first index indicating a first reference picture in a reference picture list 0 (L0), a second MV and a second index indicating a second reference picture in a reference picture list 1 (L1). In an example, the motion information of the subblock (2131(2)) that is uni-predicted includes an MV and an index indicating a reference picture in L0 or L1.

In an example, the DV (2121) is applied to a central position of the current block (2001) to locate a displaced central position in the collocated reference picture (2112). If a block including the displaced central position is not inter-coded, the SbTMVP candidate is considered not available. Otherwise, if a block (e.g., the collocated block (2101)) including the displaced central position is inter-coded, the motion information of the central position of the current block (2001), referred to as central motion of the current block (2001), can be derived from motion information of the block including the displaced central position in the collocated reference picture (2112). In an example, a scaling process can be used to derive the central motion of the current block (2001) from the motion information of the block including the displaced central position in the collocated reference picture (2112). When the SbTMVP candidate is available, the DV (2121) can be applied to find the corresponding subblock (2132) in the collocated reference picture (2112) for each subblock (2131) of the current block (2001). The motion information of the corresponding subblock (2132) can be used to derive the motion information of the subblock (2131) in the current block (2001), such as in the same way used to derive the central motion of the current block (2001). In an example, if the corresponding subblock (2132) is not inter-coded, the motion information of the current subblock (2131) is set to be the central motion of the current block (2001).

In some examples, such as in VVC, a combined subblock based merge list which includes an SbTMVP candidate and affine merge candidate(s) is used in the signaling of a subblock based merge mode. The SbTMVP mode can be enabled or disabled by a sequence parameter set (SPS) flag. If the SbTMVP mode is enabled, the SbTMVP candidate (or the SbTMVP predictor) can be added as the first entry of the subblock based merge list including subblock based merge candidates, and followed by the affine merge candidate(s). The size of the subblock based merge list can be signaled in the SPS. In an example, the maximum allowed size of the subblock based merge list is 5 in VVC. In an example, multiple SbTMVP candidates are included in the subblock based merge list.

In some examples, such as in VVC, the sub-CU size used in the SbTMVP mode is fixed to be 8×8, such as used for the affine merge mode. In an example, the SbTMVP mode is only applicable to a CU with both a width and a height being larger than or equal to 8. The subblock size (e.g., 8×8) may be configurable to other sizes, such as 4×4 in an ECM software model use for exploration beyond VVC. In an example, multiple collocated reference pictures, such as two collocated frames, are utilized to provide temporal motion information for the SbTMVP and/or the TMVP in the AMVP mode.

An offset vector, such as a displacement vector offset (DVO) can be used in the SbTMVP mode, for example, to generate better matching. The DVO can be an offset to a DV (e.g., an initial DV that is a MV of a neighboring block of a current CU) used in the SbTMVP mode. In an example, the DVO is added to the DV to determine an updated DV'. In some examples, the DVO is referred to as a motion vector offset (MVO). In an example, the updated DV' is a vector sum of the DV and the DVO. By using the DVO, a location of a collocated CU corresponding to the current CU can be adjusted, and thus an MV field within the collocated CU can be adjusted. When the DVO is not zero, the updated DV' is used as the displacement vector to indicate the location of the collocated CU to derive an SbTMVP candidate (or an SbTMVP merge candidate). Referring to FIG. 21, the updated DV' can be used as the DV (2121) to obtain the SbTMVP candidate.

The application describes the derivation of an SbTMVP candidate (or an SbTMVP merge candidate) in the SbTMVP mode using multiple displacement motion vectors (e.g., DV predictors) with a DVO (or a motion vector offset). An index is signaled to indicate which displacement motion vector is used as an initial displacement motion vector to derive the SbTMVP merge candidate. In an example, the DVO is determined using the MMVD mode.

According to an embodiment of the disclosure, a plurality of DV predictors (DVPs) and a DVO can be used to determine an updated displacement vector (or an updated DV') of a current CU (e.g., a current block) to be coded in the SbTMVP mode. The plurality of DVPs can also be referred to as DVP candidates. For the current block, index information indicating a base index and DV offset information (or DVO information) indicating the DVO can be signaled and parsed to determine the updated DV'. The base index can indicate which DVP is selected from the plurality of DVPs. The DVO can be used as an offset to the selected DVP. A location of a collocated CU (e.g., a collocated block) of the current CU (e.g., the current block) can be determined by using the selected DVP that is indicated by the base index and the DVO indicated by the DVO information. For example, the updated DV' is determined as a vector sum of the selected DVP and the DVO. The updated DV' can be used as the displacement vector to indicate the location of the collocated block, and thus to determine an SbTMVP merge candidate.

The DVO can be indicated, for example, by signaling an index indicating the DVO from DVO candidates where the DVO information includes the index. A predefined DVO list can include the DVO candidates. One or more indices can be signaled to indicate which DVO in the DVO candidates can be selected as the DVO where the DVO information can include the one or more indices.

In an example, the DVO is signaled using the MMVD mode, for example, the DVO is an MVD indicated by a direction index and/or a distance index, such as described in Tables 2-3. For examples, two indices including a distance index indicating a magnitude of the DVO and a direction index indicating a direction of the DVO are signaled to indicate the DVO, such as described in Tables 2-3.

In an embodiment, the DVO is signaled directly, for example, using any signaling method used to signal an MVD, such as the AMVP mode, the AMVR mode, and/or the like. The DVO can be signaled in different resolutions, such as ¼-, ½-, 1- or 4-luma sample resolutions using the AMVR mode.

In an embodiment, one or more DVP candidates in the plurality of DVP candidates can be determined based on spatial candidates (e.g., MVs) of respective spatial neighbors of the current block. The spatial neighbors can include the spatial neighbors (or candidate blocks) A0, A1, B0, B1, and B2 in FIG. 9. The spatial neighbors can include the spatial neighbors A0, A1, B0, and B1 in FIG. 20. The spatial neighbors of the current block can be checked in any suitable order, such as shown in FIGS. 9 and 20. In an example, a reference picture of a spatial neighbor of the current block that is used to determine a DVP candidate in the plurality of DVP candidates is the collocated reference picture.

In an embodiment, the plurality of DVP candidates is filled with a zero vector (e.g., (0, 0)) when a number of available spatial candidate(s) of respective spatial neighbor(s) is less than a threshold. In an example, each of the available spatial candidate(s) is used to determine a respective DVP candidate in the plurality of DVP candidates. For example, if a number of the DVP candidate(s) determined from the available spatial candidate(s) is less than the threshold, the zero vector is added to the plurality of DVP candidates. The spatial neighbor(s) corresponding to the available spatial candidate(s) can be inter predicted. In an example, a reference picture associated with each of the available spatial candidate(s) is the collocated reference picture.

Referring to FIG. 20, in an example, the spatial neighbors A1, B0, and B1 are inter predicted. A1 is uni-predicted using MV1 that is associated with a reference picture 1. B0 is uni-predicted using MV2 that is associated with a reference picture 2. B1 is bi-predicted using MV3-MV4 that are associated with reference pictures 3-4, respectively. The reference picture 1 and the reference picture 4 are the collocated reference picture where the reference picture 1, the reference picture 4, and the collocated reference picture are the same picture. The reference pictures 2-3 are different from the collocated reference picture. In this example, a number of the spatial neighbors (e.g., A0, A1, B0, and B1) is 4. Available spatial candidates are candidates associated with A1 and B1. The plurality of DVP candidates includes a first DVP determined based on MV1 and a second DVP determined based on MV4. In an example, the first DVP is MV1, and the second DVP is MV4.

In an example, if the threshold is 3, the plurality of DVP candidates further includes the zero vector.

In an embodiment, the plurality of DVP candidates can be derived from MVs or candidates in a merge candidate list. In an example, the merge candidate list is a regular merge candidate list, such as a regular merge/skip candidate list. The regular merge candidate list can be different from a subblock-based merge list or a subblock-based merge candidate list. The candidate(s) in the regular merge candidate list can include any suitable candidate(s) used in a regular merge/skip mode. The candidates can include spatial candidate(s) (e.g., spatial MVP(s) from spatial neighboring CU(s)), temporal candidate(s) (e.g., TMVP(s) from collocated CU(s)), HMVP candidate(s), pairwise average candidates (e.g., pairwise average MVP(s)), and/or zero MV(s). A pairwise average MVP can be generated using two existing candidates in the regular merge candidate list. The regular merge/skip mode can be different from additional merge/skip modes, such as the MMVD mode, CIIP mode, and the GPM mode.

In an example, the plurality of DVP candidates is derived from a subset of the candidates in the merge candidate list where the subset of the candidates does not include the temporal candidate(s) (e.g., the TMVP(s)).

In an embodiment, default MV(s) including but not limited to MV(s) pointing from a top-left corner of the current block to one or more positions of the collocated block in the collocated reference picture can be included in the plurality of DVP candidates. The one or more positions of the collocated block can include a middle position, a bottom right position, a right position, a left position, a bottom-left position, and/or a top-right position of the collocated block in collocated reference picture.

A subblock-based merge list (or a subblock-based merge candidate list) of the current block can include subblock-based merge candidates or subblock merge candidates. In an example, the subblock-based merge candidates include a plurality of SbTMVP merge candidates. Each of the plurality of SbTMVP merge candidates can be determined based on a respective one of the plurality of DVP candidates. For example, an updated DV' is determined based on the respective one of the plurality of DVP candidates and the DVO. The corresponding SbTMVP merge candidate (e.g., motion information of each subblock in the current block corresponding to the respective one of the plurality of DVP candidates) can be determined using the SbTMVP mode described in FIGS. 20-21. Accordingly, each of the plurality of SbTMVP merge candidates can correspond to the respective one of the plurality of DVP candidates.

In an example, the subblock-based merge list is a combined subblock-based merge list that further includes affine merge candidate(s), for example, used in an affine merge/skip mode. The affine merge candidate(s) can include affine inherited candidate(s) and affine constructed candidate(s).

In an embodiment, the subblock-based merge list includes the plurality of SbTMVP merge candidates and the affine merge candidate(s). A flag (e.g., a DVO flag)) can be signaled to indicate that the DVO can be applied to a first subset of the subblock-based merge candidates. In an example, the first subset includes the plurality of SbTMVP merge candidates and does not include an affine merge candidate. Which SbTMVP merge candidate is selected from the first subset of the subblock-based merge candidates can be indicated by the base index. As each of the plurality of SbTMVP merge candidates corresponds to the respective one of the plurality of DVP candidates, the base index indicates the selected DVP that corresponds to the selected SbTMVP merge candidate.

In an example, the DVO flag is true indicating that the DVO is to be used with the selected DVP in the plurality of DVP candidates. In an example, the DVO flag is the MMVD flag in the MMVD mode, and thus indicates that the MMVD mode is used to determine the DVO from the DVO information. The first subset of the subblock-based merge candidates can be specified such that the DVO can be applied to the first subset of the subblock-based merge candidates. In an example, the DVO is indicated using the MMVD mode, as described above. The base index (e.g., a subblock_mmvd_ base_index) can be signaled to indicate which candidate in the first subset of the subblock-based merge candidates is used.

In an embodiment, the subblock-based merge list includes a second subset of the subblock-based merge candidates. The second subset of the subblock-based merge candidates includes $K_0$ SbTMVP merge candidates (e.g., the plurality of SbTMVP merge candidates) and $K_1$ affine merge candidate(s). The base index can indicate which subblock-based merge candidate in the second subset of the subblock-based merge candidates is selected to code the current block where the selected subblock-based merge candidate corresponds to the selected DVP and the respective SbTMVP merge candidate in the plurality of SbTMVP merge candidates.

In an example, the first $K_0$ SbTMVP merge candidates from SbTMVP merge candidates of the current block are included in the second subset. In an example, the first $K_1$ affine merge candidate(s) of the current block are included in the second subset. $K_0$ and $K_1$ are positive integers. $K_0$ can be signaled in a high-level (e.g., higher than a CU level or a block level) syntax, such as a sequence parameter set (SPS), a picture parameter set (PPS), a tile header, a tile group header, a slice header, a picture header, or the like. In an example, $K_0$ is 2. $K_1$ can be signaled in the high-level syntax, such as the SPS, the PPS, the tile header, the tile group header, the slice header, the picture header, or the like.

In an example, the selection of the SbTMVP merge candidates is determined by which DVP candidates in the list from which the DV is derived.

In an embodiment, two subblock-based merge lists including an affine merge candidate list and an SbTMVP merge candidate list are used for the current block. The affine merge candidate list and the SbTMVP merge candidate list can be independent and can be constructed separately. For example, the SbTMVP merge candidate list includes the plurality of SbTMVP merge candidates and includes no affine merge candidate. The base index can indicate which SbTMVP merge candidate in the SbTMVP merge candidate list is selected where the selected SbTMVP merge candidate corresponds to the selected DVP in the plurality of DVP candidates.

A flag indicating the merge mode or the MMVD mode can be signaled indicating that the merge mode or the MMVD mode is applied to the current block. An affine flag indicating the affine merge mode and an SbTMVP flag indicating the SbTMVP mode may be signaled independently. If the SbTMVP flag is true, the SbTMVP merge candidate list can be constructed.

In an example, a first flag and a second flag are signaled to indicate whether the SbTMVP mode is used. The first flag can indicate whether a subblock-based merge mode is applied to the current block. If the first flag (e.g., being true) indicates that the subblock-based merge mode is applied to the current block, the second flag is signaled to indicate whether the subblock-based merge mode is the SbTMVP mode. The second flag also indicates whether the affine merge candidate list or the SbTMVP merge candidate list is constructed for the current block. For example, if the second flag indicates that the subblock-based merge mode is the SbTMVP mode, the SbTMVP merge candidate list is constructed for the current block.

In an embodiment, the subblock-based merge list includes subblock-based merge candidate(s). The subblock-based merge candidate(s) include only a single SbTMVP candidate with or without affine merge candidate(s). A number of SbTMVP candidate(s) in the subblock-based merge list is 1. A first index can be signaled to indicate which subblock-based merge candidate in the subblock-based merge list is selected. The single SbTMVP candidate being selected can indicate that the SbTMVP mode is applied to the current block. A second index can be signaled to indicate which DVP in the plurality of DVP candidates is selected to construct the single SbTMVP candidate. The second index can be the base index (e.g., represented by a syntax sbtmvp_mmvd_base_index). In an example, the updated DV' is obtained by a vector sum of the selected DVP and the DVO. Motion information of each subblock in the current block can be obtained from motion information of a corresponding subblock in the collocated block that is determined based on the updated DV', such as described in FIGS. 20-21. Thus, the single SbTMVP candidate can be determined where the single SbTMVP candidate includes the motion information of each subblock in the current block.

In an example, a value of the base index (e.g., the syntax sbtmvp_mmvd_base_index) is determined by which DVP candidate in the list where the DV is derived from. For example, the value of the base index points to a position of the desired DVP candidate in the constructed list.

Figure 22:
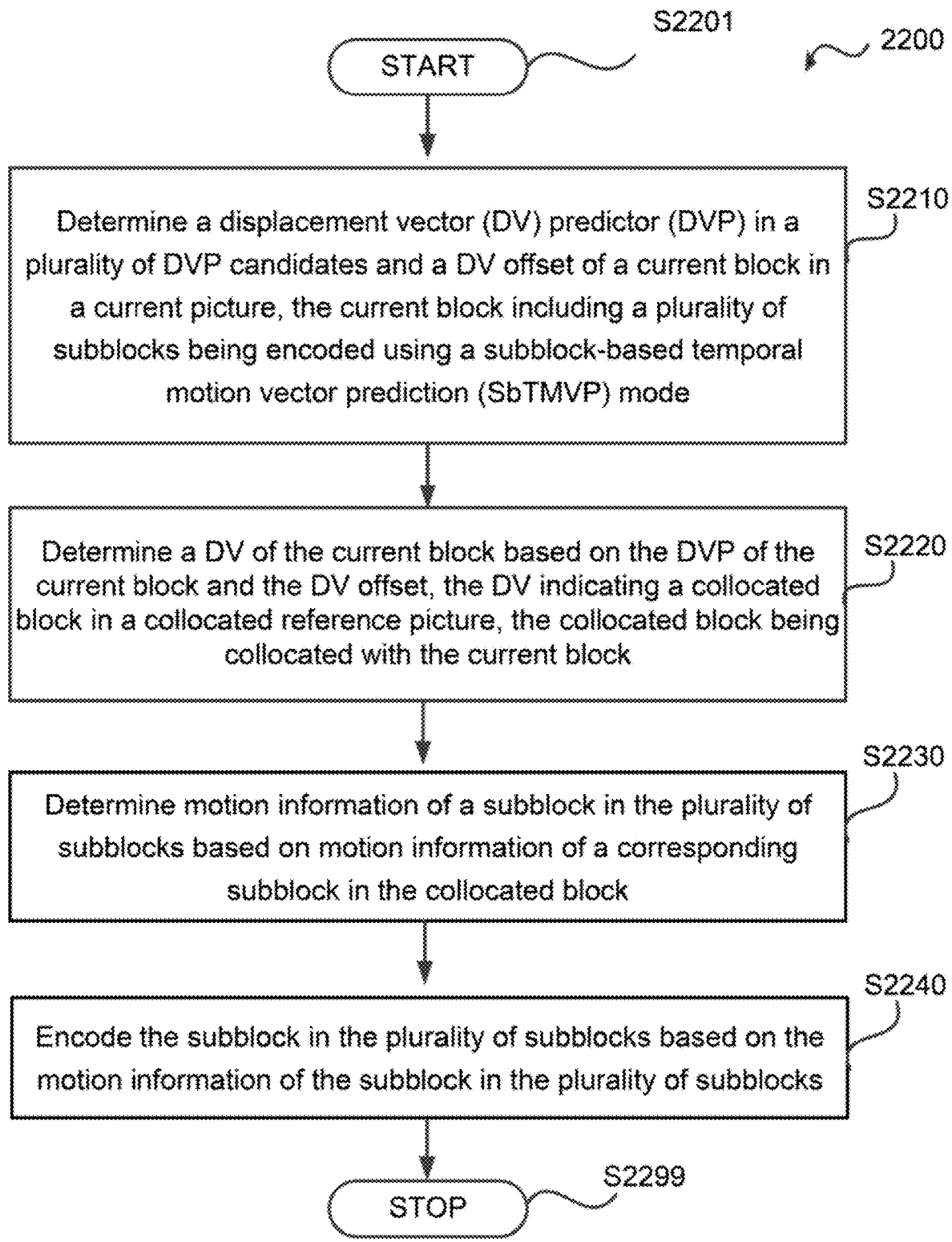
FIG. 22 shows a flow chart outlining an encoding process according to some embodiment of the disclosure.

FIG. 22 shows a flow chart outlining a process (2200) according to an embodiment of the disclosure. The process (2200) can be used in a video encoder. The process (2200) can be executed by an apparatus for video coding that can include processing circuitry. In various embodiments, the process (2200) is executed by the processing circuitry, such as the processing circuitry in the terminal devices (310), (320), (330) and (340), the processing circuitry that performs functions of the video encoder (403), the processing circuitry that performs functions of the video encoder (603), the processing circuitry that performs functions of the video encoder (703), and the like. In some embodiments, the process (2200) is implemented in software instructions, thus when the processing circuitry executes the software instructions, the processing circuitry performs the process (2200). The process starts at (S2201) and proceeds to (S2210).

At (S2210), a displacement vector (DV) predictor (DVP) in a plurality of DVP candidates and a DV offset of a current block in a current picture can be determined. The current block includes a plurality of subblocks and can be encoded using a subblock-based temporal motion vector prediction (SbTMVP) mode.

In an example, the plurality of DVP candidates is determined based on motion vectors (MVs) of spatial neighbors of the current block where a reference picture of each of the spatial neighbors that is used to determine one of the plurality of DVP candidates is the collocated reference picture.

If a number of the MVs of the spatial neighbors is less than a threshold, a zero MV can be inserted into the plurality of DVP candidates.

In an example, the plurality of DVP candidates is determined based on candidates in a merge candidate list. The candidates can include at least one of (a) a spatial motion vector predictor (MVP) candidate, (b) a history-based MVP (HMVP) candidate, (c) a pairwise average candidate, or (d) a zero motion vector (MV), and the candidates do not include a temporal MVP (TMVP) candidate. A reference picture of each of the candidates that is used to determine one of the plurality of DVP candidates can be the collocated reference picture.

At (S2220), a DV of the current block can be determined based on the DVP of the current block and the DV offset. The DV indicates a block in a collocated reference picture. The block is collocated with the current block and is referred to as a collocated block of the current block. In an example, the DV is determined to be a vector sum of the DVP and the DV offset.

At (S2230), motion information of a subblock in the plurality of subblocks is determined based on motion information of a corresponding subblock in the collocated block.

At (S2240), the subblock in the plurality of subblocks is encoded based on the motion information of the subblock in the plurality of subblocks.

Then, the process (2200) proceeds to (S2299) and terminates.

The process (2200) can be suitably adapted to various scenarios and steps in the process (2200) can be adjusted accordingly. One or more of the steps in the process (2200) can be adapted, omitted, repeated, and/or combined. Any suitable order can be used to implement the process (2200). Additional step(s) can be added.

In an example, a subblock-based merge list of the current block is constructed. Subblock-based merge candidates in the subblock-based merge list can include a plurality of SbTMVP merge candidates and at least one affine merge candidate. Each of the plurality of SbTMVP merge candidates can correspond to a respective one of the plurality of DVP candidates.

In an example, a base index indicating the DVP in the plurality of DVP candidates of the current block is encoded and included in a bitstream.

In an example, the base index indicates which SbTMVP merge candidate in a subset of the subblock-based merge candidates that is the plurality of SbTMVP merge candidates is to be selected where the selected SbTMVP merge candidate corresponds to the DVP.

In an example, a first number $K_0$ of the plurality of SbTMVP merge candidates and a second number $K_1$ of the at least one affine merge candidate are signaled in a high-level syntax. $K_0$ and $K_1$ are positive integers. The base index indicates which subblock-based merge candidate in a subset of the subblock-based merge candidates that includes (i) the plurality of SbTMVP merge candidates and (ii) the at least one affine merge candidate is to be selected. The selected subblock-based merge candidate corresponds to the DVP and one of the plurality of SbTMVP merge candidates.

In an example, an SbTMVP merge candidate list of the current block including a plurality of SbTMVP merge candidates is constructed. Each of the plurality of SbTMVP merge candidates corresponds to a respective one of the plurality of DVP candidates. The SbTMVP merge candidate list does not include an affine merge candidate.

In an embodiment, a merge mode or a merge motion vector difference (MMVD) mode is applied to the current block.

A flag is encoded and signaled in the bitstream and the flag indicates that the SbTMVP mode is applied to the current block.

In an example, a first flag is encoded and signaled in the bitstream where the first flag indicates that a subblock-based merge mode is applied to the current block. A second flag is encoded and signaled in the coded video bitstream where the second flag indicates that the subblock-based merge mode is the SbTMVP mode.

In an example, a subblock-based merge list of the current block is constructed. The subblock-based merge list includes one SbTMVP merge candidate and at least one affine merge candidate where the one SbTMVP merge candidate corresponds to the DVP. An index that points to the one SbTMVP merge candidate in the subblock-based merge list can be encoded and signaled in the bitstream where the index indicates that the SbTMVP mode is applied to the current block.

In an embodiment, the current block including the plurality of subblocks is encoded in the SbTMVP mode. The plurality of DVP candidates for the current block can be determined. Each DVP candidate is derived from one or more MVs. The DV for the current block can be determined based on the DVP in the plurality of DVP candidates for the current block and the DV offset of the current block. The DV indicates the block collocated with the current block in the collocated reference picture. The subblock in the plurality of subblocks can be encoded based on motion information of the corresponding subblock in the collocated block.

Figure 23A:
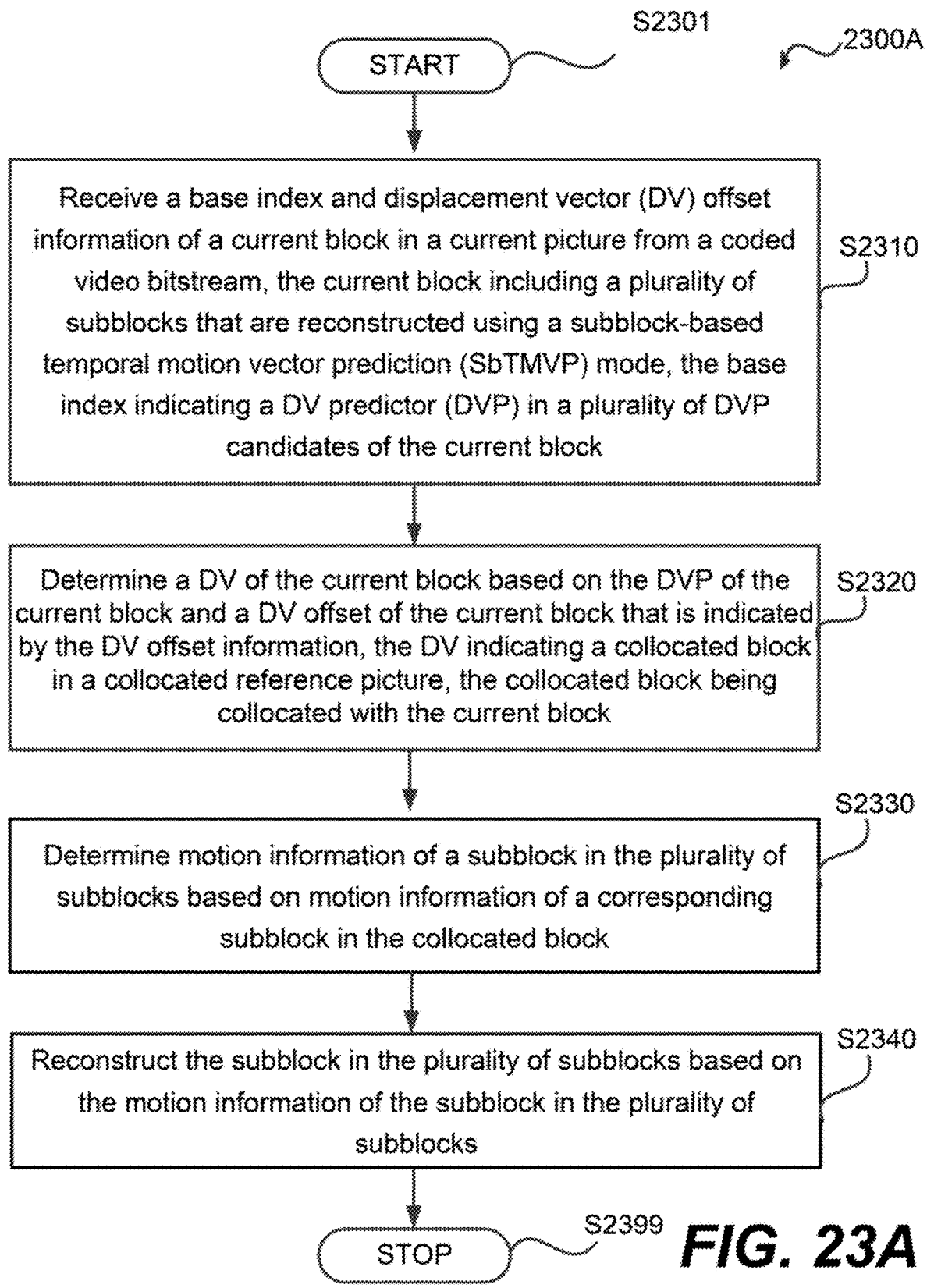
FIG. 23A shows a flow chart outlining a decoding process according to some embodiment of the disclosure.

FIG. 23A shows a flow chart outlining a process (2300A) according to an embodiment of the disclosure. The process (2300A) can be used in a video decoder. The process (2300A) can be executed by an apparatus for video coding that can include receiving circuitry and processing circuitry. In various embodiments, the process (2300A) is executed by the processing circuitry, such as the processing circuitry in the terminal devices (310), (320), (330) and (340), the processing circuitry that performs functions of the video decoder (410), the processing circuitry that performs functions of the video decoder (510), and the like. In some embodiments, the process (2300A) is implemented in software instructions, thus when the processing circuitry executes the software instructions, the processing circuitry performs the process (2300A). The process starts at (S2301) and proceeds to (S2310).

At (S2310), a base index and displacement vector (DV) offset information of a current block in a current picture can be received from a coded video bitstream. The current block can include a plurality of subblocks that are reconstructed using a subblock-based temporal motion vector prediction (SbTMVP) mode. The base index can indicate a DV predictor (DVP) in a plurality of DVP candidates of the current block.

In an example, the plurality of DVP candidates is determined based on motion vectors (MVs) of spatial neighbors of the current block where a reference picture of each of the spatial neighbors that is used to determine one of the plurality of DVP candidates is the collocated reference picture.

If a number of the MVs of the spatial neighbors is less than a threshold, a zero MV can be inserted into the plurality of DVP candidates.

In an example, the plurality of DVP candidates is determined based on candidates in a merge candidate list. The candidates can include at least one of (a) a spatial motion vector predictor (MVP) candidate, (b) a history-based MVP (HMVP) candidate, (c) a pairwise average candidate, or (d) a zero motion vector (MV), and the candidates do not include a temporal MVP (TMVP) candidate. A reference picture of each of the candidates that is used to determine one of the plurality of DVP candidates can be the collocated reference picture.

At (S2320), a DV of the current block can be determined based on the DVP of the current block and a DV offset of the current block that is indicated by the DV offset information. The DV can indicate a block in a collocated reference picture. The block is collocated with the current block and is referred to as a collocated block. In an example, the DV is determined to be a vector sum of the DVP and the DV offset.

At (S2330), motion information of a subblock in the plurality of subblocks can be determined based on motion information of a corresponding subblock in the collocated block.

At (S2340), the subblock in the plurality of subblocks can be reconstructed based on the motion information of the subblock in the plurality of subblocks.

Then, the process (2300A) proceeds to (S2399) and terminates.

The process (2300A) can be suitably adapted to various scenarios and steps in the process (2300A) can be adjusted accordingly. One or more of the steps in the process (2300A) can be adapted, omitted, repeated, and/or combined. Any suitable order can be used to implement the process (2300A). Additional step(s) can be added.

In an example, a subblock-based merge list of the current block is constructed. Subblock-based merge candidates in the subblock-based merge list can include a plurality of SbTMVP merge candidates and at least one affine merge candidate. Each of the plurality of SbTMVP merge candidates can correspond to a respective one of the plurality of DVP candidates.

In an example, the base index indicates which SbTMVP merge candidate in a subset of the subblock-based merge candidates that is the plurality of SbTMVP merge candidates is to be selected where the selected SbTMVP merge candidate corresponds to the DVP.

In an example, a first number $K_0$ of the plurality of SbTMVP merge candidates and a second number $K_1$ of the at least one affine merge candidate are signaled in a high-level syntax. $K_0$ and $K_1$ are positive integers. The base index indicates which subblock-based merge candidate in a subset of the subblock-based merge candidates that includes (i) the plurality of SbTMVP merge candidates and (ii) the at least one affine merge candidate is to be selected, the selected subblock-based merge candidate corresponding to the DVP and one of the plurality of SbTMVP merge candidates.

In an example, an SbTMVP merge candidate list of the current block including a plurality of SbTMVP merge candidates is constructed. Each of the plurality of SbTMVP merge candidates corresponds to a respective one of the plurality of DVP candidates. The SbTMVP merge candidate list does not include an affine merge candidate.

In an embodiment, a merge mode or a merge motion vector difference (MMVD) mode is applied to the current block.

A flag is received from the coded video bitstream and the flag indicates that the SbTMVP mode is applied to the current block.

In an example, a first flag is received from the coded video bitstream where the first flag indicates that a subblock-based merge mode is applied to the current block. A second flag is received from the coded video bitstream where the second flag indicates that the subblock-based merge mode is the SbTMVP mode.

In an example, a subblock-based merge list of the current block is constructed. The subblock-based merge list includes one SbTMVP merge candidate and at least one affine merge candidate where the one SbTMVP merge candidate corresponds to the DVP. An index that points to the one SbTMVP merge candidate in the subblock-based merge list can be received where the index indicates that the SbTMVP mode is applied to the current block.

Figure 23B:
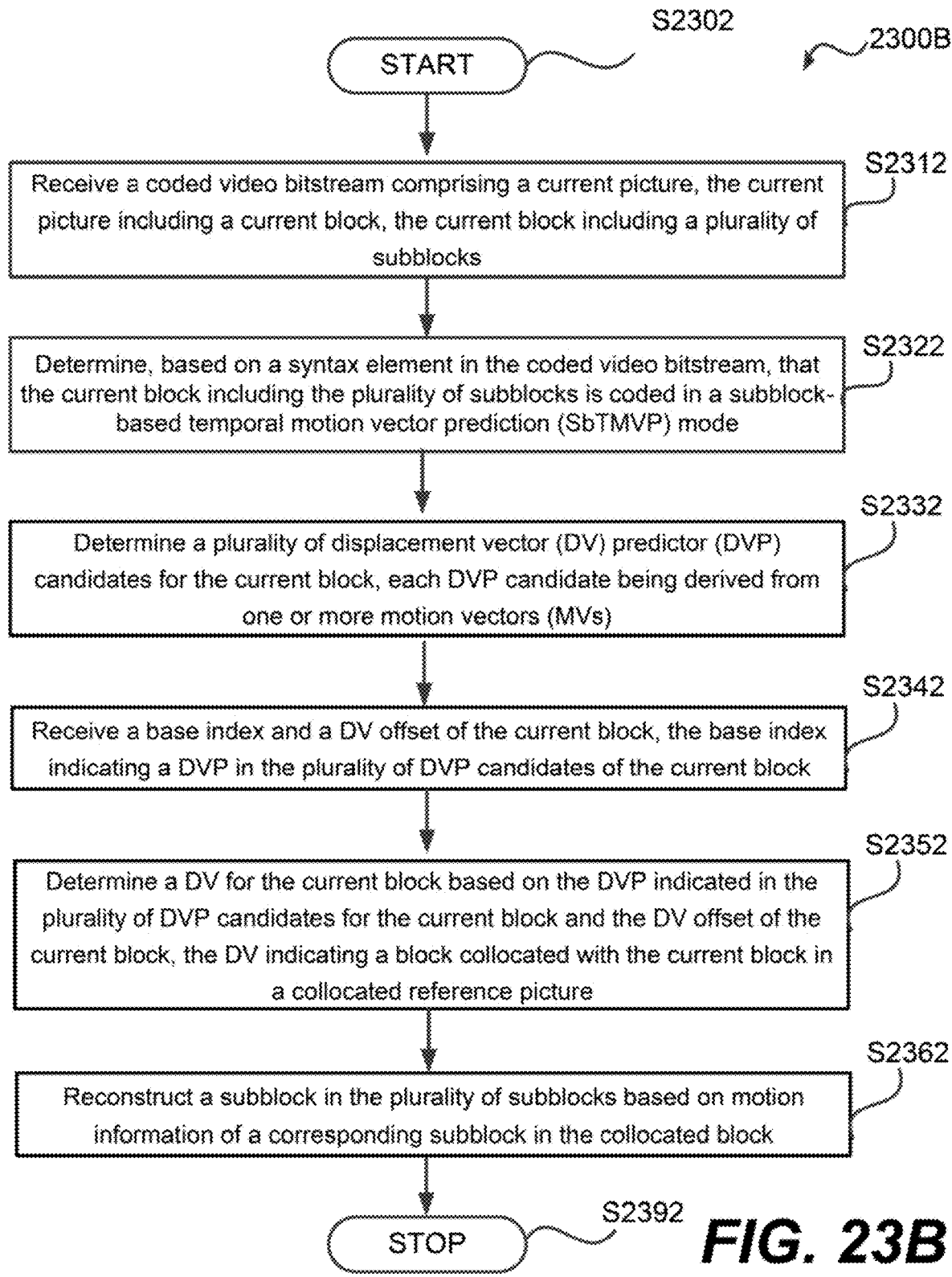
FIG. 23B shows a flow chart outlining a decoding process according to some embodiment of the disclosure.

FIG. 23B shows a flow chart outlining a process (2300B) according to an embodiment of the disclosure. The process (2300B) is a variation to the process (2300A). The process (2300B) can be used in a video decoder. The process (2300B) can be executed by an apparatus for video coding that can include receiving circuitry and processing circuitry. In various embodiments, the process (2300B) is executed by the processing circuitry, such as the processing circuitry in the terminal devices (310), (320), (330) and (340), the processing circuitry that performs functions of the video decoder (410), the processing circuitry that performs functions of the video decoder (510), and the like. In some embodiments, the process (2300B) is implemented in software instructions, thus when the processing circuitry executes the software instructions, the processing circuitry performs the process (2300B). The process starts at (S2302) and proceeds to (S2312).

At (S2312), a coded video bitstream comprising a current picture is received. The current picture includes a current block. The current block includes a plurality of subblocks.

At (S2322), that the current block including the plurality of subblocks is coded in a subblock-based temporal motion vector prediction (SbTMVP) mode is determined based on a syntax element in the coded video bitstream.

At (S2332), a plurality of displacement vector (DV) predictor (DVP) candidates for the current block can be determined. Each DVP candidate can be derived from one or more motion vectors (MVs).

At (S2342), a base index and a DV offset of the current block can be received. The base index indicates a DVP in the plurality of DVP candidates of the current block.

At (S2352), a DV for the current block can be described based on the DVP indicated in the plurality of DVP candidates for the current block and the DV offset of the current block. The DV indicates a block collocated with the current block in a collocated reference picture.

At (S2362), a subblock in the plurality of subblocks can be reconstructed based on motion information of a corresponding subblock in the collocated block.

Then, the process (2300B) proceeds to (S2392) and terminates.

Various embodiments used in the process (2300A) can be applied to the process (2300B). The process (2300 B) can be suitably adapted to various scenarios and steps in the process (2300B) can be adjusted accordingly. One or more of the steps in the process (2300B) can be adapted, omitted, repeated, and/or combined. Any suitable order can be used to implement the process (2300B). Additional step(s) can be added.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 24 shows a computer system (2400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 24:
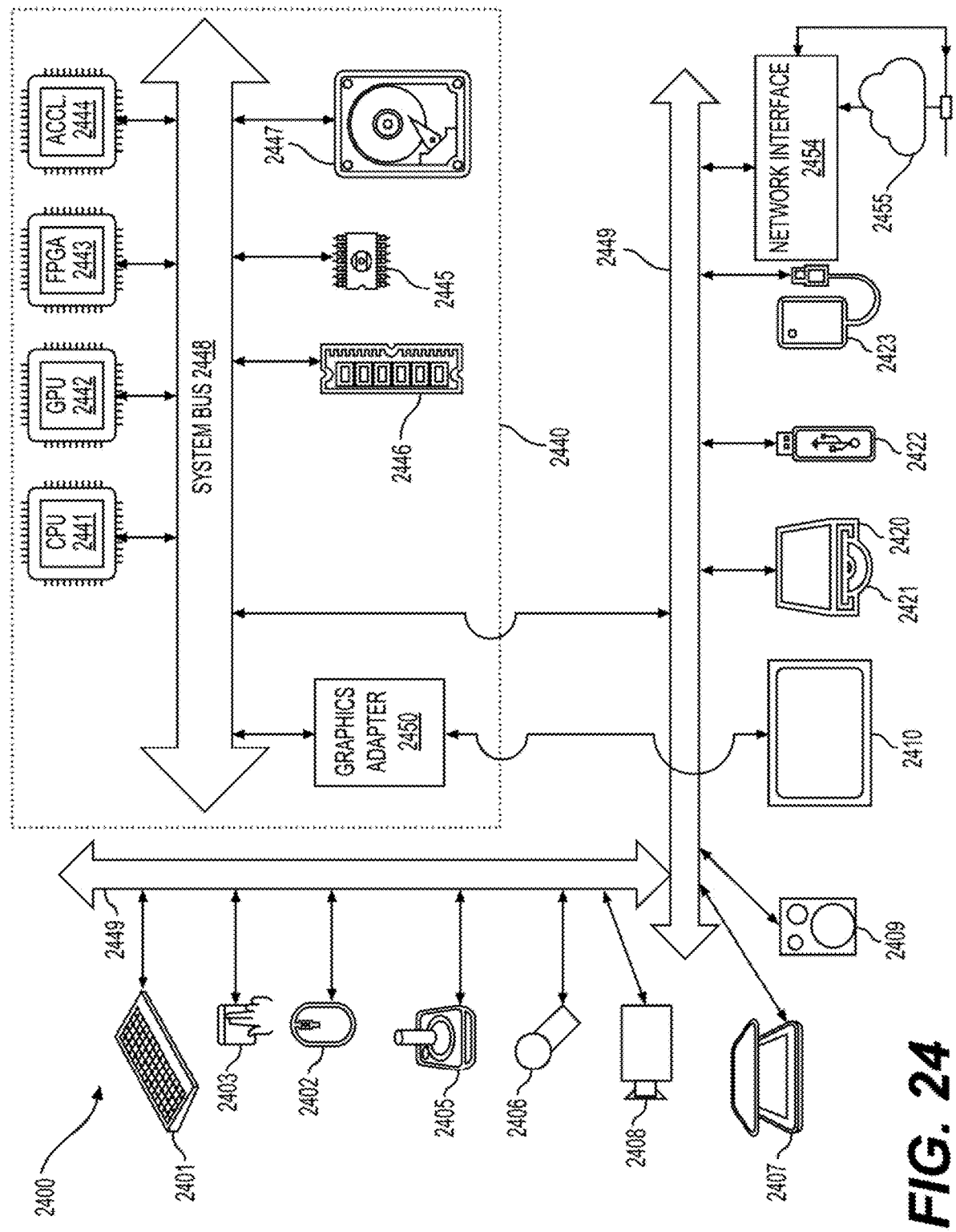
FIG. 24 is a schematic illustration of a computer system in accordance with an embodiment.

The components shown in FIG. 24 for computer system (2400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2400).

Computer system (2400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2401), mouse (2402), trackpad (2403), touch screen (2410), data-glove (not shown), joystick (2405), microphone (2406), scanner (2407), camera (2408).

Computer system (2400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2410), data-glove (not shown), or joystick (2405), but there can also be tactile feedback devices that do not serve as input devices), audio output devices (such as: speakers (2409), headphones (not depicted)), visual output devices (such as screens (2410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2400) can also include human accessible storage devices and their associated media such as optical media including CD/DVD ROM/RW (2420) with CD/DVD or the like media (2421), thumb-drive (2422), removable hard drive or solid state drive (2423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2400) can also include an interface (2454) to one or more communication networks (2455). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2449) (such as, for example USB ports of the computer system (2400)); others are commonly integrated into the core of the computer system (2400) by attachment to a system bus as described below (for example Ethernet interface into a PC computer system or cellular network interface into a smartphone computer system). Using any of these networks, computer system (2400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2440) of the computer system (2400).

The core (2440) can include one or more Central Processing Units (CPU) (2441), Graphics Processing Units (GPU) (2442), specialized programmable processing units in the form of Field Programmable Gate Areas (FPGA) (2443), hardware accelerators for certain tasks (2444), graphics adapters (2450), and so forth. These devices, along with Read-only memory (ROM) (2445), Random-access memory (2446), internal mass storage such as internal non-user accessible hard drives, SSDs, and the like (2447), may be connected through a system bus (2448). In some computer systems, the system bus (2448) can be accessible in the form of one or more physical plugs to enable extensions by additional CPUs, GPU, and the like. The peripheral devices can be attached either directly to the core's system bus (2448), or through a peripheral bus (2449). In an example, the screen (2410) can be connected to the graphics adapter (2450). Architectures for a peripheral bus include PCI, USB, and the like.

CPUs (2441), GPUs (2442), FPGAs (2443), and accelerators (2444) can execute certain instructions that, in combination, can make up the aforementioned computer code. That computer code can be stored in ROM (2445) or RAM (2446). Transitional data can also be stored in RAM (2446), whereas permanent data can be stored for example, in the internal mass storage (2447). Fast storage and retrieve to any of the memory devices can be enabled through the use of cache memory, that can be closely associated with one or more CPU (2441), GPU (2442), mass storage (2447), ROM (2445), RAM (2446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2400), and specifically the core (2440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2440) that are of non-transitory nature, such as core-internal mass storage (2447) or ROM (2445). The software implementing various embodiments of the present disclosure can be stored in such devices and executed by core (2440). A computer-readable medium can include one or more memory devices or chips, according to particular needs. The software can cause the core (2440) and specifically the processors therein (including CPU, GPU, FPGA, and the like) to execute particular processes or particular parts of particular processes described herein, including defining data structures stored in RAM (2446) and modifying such data structures according to the processes defined by the software. In addition or as an alternative, the computer system can provide functionality as a result of logic hardwired or otherwise embodied in a circuit (for example: accelerator (2444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, comprising:
receiving a coded video bitstream comprising a current picture, the current picture including a current block, a syntax element in the coded video bitstream indicating that the current block that includes a plurality of subblocks is coded in a subblock-based temporal motion vector prediction (SbTMVP) mode;
determining a plurality of motion shift predictor candidates for the current block, each motion shift predictor candidate being derived from one or more motion vectors (MVs);
constructing a subblock-based merge list of the current block, subblock-based merge candidates in the subblock-based merge list including a plurality of SbTMVP merge candidates and at least one affine merge candidate, each of the plurality of SbTMVP merge candidates corresponding to a respective one of the plurality of motion shift predictor candidates;
receiving a base index and motion shift offset information indicating a motion shift offset of the current block, the base index indicating which SbTMVP merge candidate in a subset of the subblock-based merge candidates that is only the plurality of SbTMVP merge candidates is to be selected, the selected SbTMVP merge candidate corresponding to the motion shift predictor in the plurality of motion shift predictor candidates of the current block;
determining a motion shift of the current block as a vector sum of the motion shift predictor indicated by the base index and the motion shift offset of the current block, wherein the motion shift of the current block indicates a block in a collocated reference picture;
determining motion information of a subblock of the plurality of subblocks in the current block based on motion information of a subblock in the block indicated by the motion shift that is the vector sum of the motion shift offset and the motion shift predictor; and
reconstructing the subblock in the current block based on the motion information of the subblock in the current block.

2. The method of claim 1, wherein the determining the plurality of motion shift predictor candidates comprises:
determining the plurality of motion shift predictor candidates based on MVs of spatial neighbors of the current block, a reference picture of each of the spatial neighbors that is used to determine one of the plurality of motion shift predictor candidates being the collocated reference picture.

3. The method of claim 2, wherein the determining the plurality of motion shift predictor candidates comprises:
when a number of the MVs of the spatial neighbors is less than a threshold, inserting a zero MV into the plurality of motion shift predictor candidates.

4. The method of claim 1, wherein the determining the plurality of motion shift predictor candidates comprises:
determining the plurality of motion shift predictor candidates based on candidates in a merge candidate list, the candidates including at least one of (a) a spatial motion vector predictor (MVP) candidate, (b) a history-based MVP (HMVP) candidate, (c) a pairwise average candidate, or (d) a zero motion vector (MV), the candidates not including a temporal MVP (TMVP) candidate, a reference picture of each of the candidates that is used to determine one of the plurality of motion shift predictor candidates being the collocated reference picture.

5. The method of claim 1, wherein
a first number $K_0$ of the plurality of SbTMVP merge candidates and a second number $K_1$ of the at least one affine merge candidate are signaled in a high-level syntax, $K_0$ and $K_1$ being positive integers.

6. The method of claim 1, wherein
a merge mode or a merge motion vector difference (MMVD) mode is applied to the current block; and
the method includes receiving a flag from the coded video bitstream, the flag indicating that the SbTMVP mode is applied to the current block.

7. The method of claim 1, wherein
a merge mode or a merge motion vector difference (MMVD) mode is applied to the current block; and
the method includes:
receiving a first flag from the coded video bitstream, the first flag indicating that a subblock-based merge mode is applied to the current block; and
receiving a second flag from the coded video bitstream, the second flag indicating that the subblock-based merge mode is the SbTMVP mode.

8. A method of video encoding, comprising:
determining a plurality of motion shift predictor candidates for a current block in a current picture, each motion shift predictor candidate being derived from one or more motion vectors (MVs), the current block including a plurality of subblocks to be coded in a subblock-based temporal motion vector prediction (SbTMVP) mode;
determining a motion shift predictor in the plurality of motion shift predictor candidates and a motion shift offset of the current block;

determining a motion shift of the current block as a vector sum of the motion shift predictor and the motion shift offset of the current block, wherein the motion shift of the current block indicates a block in a collocated reference picture;

determining motion information of a subblock of the plurality of subblocks in the current block based on motion information of a subblock in the block indicated by the motion shift that is the vector sum of the motion shift offset and the motion shift predictor;

constructing a subblock-based merge list of the current block, subblock-based merge candidates in the subblock-based merge list including a plurality of SbTMVP merge candidates and at least one affine merge candidate, each of the plurality of SbTMVP merge candidates corresponding to a respective one of the plurality of motion shift predictor candidates;

encoding, in a bitstream, the subblock in the current block based on the motion information of the subblock in the current block; and encoding, in the bitstream, a base index indicating which SbTMVP merge candidate in a subset of the subblock-based merge candidates that is only the plurality of SbTMVP merge candidates is selected, motion shift offset information indicating the motion shift offset of the current block, and a syntax element indicating that the current block is coded in the SbTMVP mode, the selected SbTMVP merge candidate corresponding to the motion shift predictor in the plurality of motion shift predictor candidates of the current block.

9. The method of claim 8, wherein the determining the plurality of motion shift predictor candidates comprises:
determining the plurality of motion shift predictor candidates based on MVs of spatial neighbors of the current block, a reference picture of each of the spatial neighbors that is used to determine one of the plurality of motion shift predictor candidates being the collocated reference picture.

10. The method of claim 8, wherein the determining the plurality of motion shift predictor candidates comprises:
determining the plurality of motion shift predictor candidates based on candidates in a merge candidate list, the candidates including at least one of (a) a spatial motion vector predictor (MVP) candidate, (b) a history-based MVP (HMVP) candidate, (c) a pairwise average candidate, or (d) a zero motion vector (MV), the candidates not including a temporal MVP (TMVP) candidate, a reference picture of each of the candidates that is used to determine one of the plurality of motion shift predictor candidates being the collocated reference picture.

11. A method of processing visual media data, the method comprising:
processing a bitstream of the visual media data according to a format rule, wherein
the bitstream includes a syntax element, a base index, and motion shift offset information of a current block in a current picture, the syntax element indicating that the current block that includes a plurality of subblocks is coded in a subblock-based temporal motion vector prediction (SbTMVP) mode, and the motion shift offset information indicating a motion shift offset of the current block; and
the format rule specifies that:
each of a plurality of motion shift predictor candidates for the current block is derived from one or more motion vectors (MVs);
a subblock-based merge list of the current block is constructed, subblock-based merge candidates in the subblock-based merge list including a plurality of SbTMVP merge candidates and at least one affine merge candidate, each of the plurality of SbTMVP merge candidates corresponding to a respective one of the plurality of motion shift predictor candidates, the base index indicating which SbTMVP merge candidate in a subset of the subblock-based merge candidates that is only the plurality of SbTMVP merge candidates is to be selected, the selected SbTMVP merge candidate corresponding to the motion shift predictor in the plurality of motion shift predictor candidates of the current block;
a motion shift of the current block is determined as a vector sum of the motion shift predictor and the motion shift offset of the current block, the motion shift of the current block indicating a block in a collocated reference picture;
motion information of a subblock of the plurality of subblocks in the current block is determined based on motion information of a subblock in the block indicated by the motion shift that is the vector sum of the motion shift offset and the motion shift predictor; and
the subblock in the current block is reconstructed based on the motion information of the subblock in the current block.

* * * * *